United States Patent
Rodriguez Bravo

(10) Patent No.: US 12,039,094 B2
(45) Date of Patent: Jul. 16, 2024

(54) INPUT/OUTPUT INTERFACE SECURITY

(71) Applicant: KYNDRYL, INC., New York, NY (US)

(72) Inventor: Cesar Augusto Rodriguez Bravo, Alajuela (CR)

(73) Assignee: KYNDRYL, INC., New York, NY (US)

( * ) Notice: Subject to any disclaimer, the term of this patent is extended or adjusted under 35 U.S.C. 154(b) by 138 days.

(21) Appl. No.: 17/515,365

(22) Filed: Oct. 29, 2021

(65) Prior Publication Data

US 2023/0139807 A1    May 4, 2023

(51) Int. Cl.
*G06F 21/85* (2013.01)
*G06F 21/57* (2013.01)
*G06F 21/64* (2013.01)
*G06F 21/81* (2013.01)

(52) U.S. Cl.
CPC ............ *G06F 21/85* (2013.01); *G06F 21/577* (2013.01); *G06F 21/64* (2013.01); *G06F 21/81* (2013.01)

(58) Field of Classification Search
CPC ........... G06F 21/85; G06F 21/64; G06F 21/81
See application file for complete search history.

(56) References Cited

U.S. PATENT DOCUMENTS

| | | | |
|---|---|---|---|
| 7,721,115 B2 | 5/2010 | Luttmann et al. | |
| 7,904,565 B2 * | 3/2011 | Holden | H04L 9/3273 709/227 |
| 8,386,795 B2 | 2/2013 | Lu et al. | |
| 10,419,459 B2 * | 9/2019 | Touboul | H04L 63/1416 |
| 10,581,869 B2 * | 3/2020 | Simons | H04L 9/3226 |
| 10,771,478 B2 * | 9/2020 | Fahrny | H04L 63/1416 |
| 11,042,644 B2 * | 6/2021 | Sheng | G06F 9/4405 |
| 11,399,031 B2 * | 7/2022 | McBride | G06F 21/64 |
| 11,580,224 B2 * | 2/2023 | Shattuck | G06F 21/566 |
| 11,652,815 B2 * | 5/2023 | Keith, Jr. | H04L 9/0838 726/5 |

(Continued)

FOREIGN PATENT DOCUMENTS

| | | |
|---|---|---|
| CN | 102314574 A | 1/2012 |
| CN | 104462940 A | 3/2015 |

(Continued)

OTHER PUBLICATIONS

Tian, "Defending Against Malicious USB Firmware with GoodUSB," ACSAC '15, Dec. 7-11, 2015, Los Angeles, CA USA, pp. 1-10.

(Continued)

*Primary Examiner* — Viral S Lakhia
(74) *Attorney, Agent, or Firm* — Dan Housley; Andrew M. Calderon; Calderon Safran & Wright, P.C.

(57) ABSTRACT

Methods, computer program products, and systems are presented. The Methods, computer program products, and systems can include, for example: examining hardware device transmitted data received through an I/O interface port of a computer system; determining in dependence on the examining whether the hardware device transmitted data received through the I/O interface port of the computer system satisfies a criterion; and in response to determining that the hardware device transmitted data received through the I/O interface port of the computer system satisfies the criterion, initiating a security process for protecting the computer system.

25 Claims, 9 Drawing Sheets

(56) References Cited

U.S. PATENT DOCUMENTS

| | | | | |
|---|---|---|---|---|
| 11,775,327 | B2* | 10/2023 | Pepus | G06F 21/64 |
| | | | | 718/1 |
| 11,783,062 | B2* | 10/2023 | Lounsberry | G06F 21/6218 |
| | | | | 726/30 |
| 2011/0296164 | A1* | 12/2011 | Boebert | G06F 21/604 |
| | | | | 709/225 |
| 2015/0365237 | A1* | 12/2015 | Soffer | G06F 13/105 |
| | | | | 726/20 |
| 2017/0019443 | A1* | 1/2017 | Conan | H04N 21/6181 |
| 2017/0022082 | A1 | 1/2017 | Prabhu et al. | |
| 2017/0214701 | A1* | 7/2017 | Hasan | H04L 63/1491 |
| 2017/0220823 | A1* | 8/2017 | Law | H04L 9/0861 |
| 2018/0293376 | A1* | 10/2018 | El Abed | G06F 21/552 |
| 2021/0084032 | A1* | 3/2021 | Ding | G06F 9/54 |
| 2021/0251019 | A1* | 8/2021 | Sayed | H04L 41/0806 |
| 2022/0103351 | A1* | 3/2022 | Cooper | G07C 9/00857 |

FOREIGN PATENT DOCUMENTS

| | | |
|---|---|---|
| WO | WO2016209203 A1 | 12/2016 |
| WO | WO2019030748 A1 | 2/2019 |

OTHER PUBLICATIONS

Wikipedia, "USB Human Interface Device Class," Wikipedia.org, Retrieved from the Internet, accessed Apr. 22, 21, pp. 1-5 <https://en.wikipedia.org/wiki/USB_human_interface_device_class>.

USB, "Universal Serial Bus—Device Class Definition for Human Interface Devices (HID)," 1996-2001 USB Implementers' Forum, Jun. 27, 2001, pp. 1-97 <http://www.usb.org/developers/hidpage/HID1_11.pdf>.

YouTube, "USB Credential Stealing While Screen is Locked," YOUTUBE.com, Retrieved from the Internet, accessed Apr. 22, 2021, pp. 1-3 <https://www.youtube.com/watch?v=Oplubg5q7ao>.

Fuller, "Snagging Creds From Locked Machines," Malicious.Link, Sep. 6, 2016, Retrieved from the Internet, accessed Apr. 22, 2021, pp. 1-9 <https://malicious.link/post/2016/snagging-creds-from-locked-machines/>.

Eaton, "Building a USB Rubber Ducky for $7," Aug. 7, 2017, Medium.com, Retrieved from the Internet, accessed Apr. 22, 2021, pp. 1-7 <https://medium.com/@EatonChips/building-a-usb-rubber-ducky-for-7-c851aae30a1d>.

Brody. "USB Rubber Ducky Tutorial: The Missing Quickstart Guide to Running Your First Keystroke Payload Hack," Hartleybrody.com, Retrieved from the Internet, accessed Apr. 22, 2021, pp. 1-11 <https://blog.hartleybrody.com/rubber-ducky-guide/>.

IIAK5, "USB Rubber Ducky—IIAK5," hak5.org, Retrieved from the Internet, accessed Apr. 22, 2021, pp. 1-4 <https://shop.hak5.org/products/usb-rubber-ducky-deluxe>.

Behind the Sciences, "Make Your Own DIY USB Rubber Ducky," Behindthesciences.com, May 12, 2017, Retrieved from the Internet, accessed Apr. 22, 2021, pp. 1-11 <https://behindthesciences.com/electronics/make-your-own-diy-usb-rubber-ducky/>.

BASIC4, "USB-Rubber-Ducky-Clone-Using-Arduino-Leonardo-Beetle," Github.com, Retrieved from the Internet, accessed Apr. 22, 2021, pp. 1-2 <https://github.com/basic4/USB-Rubber-Ducky-Clone-using-Arduino-Leonardo-Beetle>.

Markets and Markets, "Cybersecurity Market Size, Share and Global Market Forecast to 2023," Market-Reports, Retrieved from the Internet, accessed Apr. 22, 2021, pp. 1-19 <https://www.marketsandmarkets.com/Market-Reports/cyber-security-market-505.html>.

Zhukov, "Turning a Regular USB Flash Drive into a USB Rubber Ducky," HackMag.com, Retrieved from the Internet, accessed Apr. 22, 2021, pp. 1-17 <https://hackmag.com/security/rubber-ducky/>.

LMG Security, "Bad USB, Very Bad USB," Imgsecurity.com, Retrieved from the Internet, accessed Apr. 27, 2021, p. 1-6 <https://www.lmgsecurity.com/bad-usb-very-bad-usb/>.

Nachreiner, "USB Lock Screen Bypass—Daily Security Byte," Secplicity.org, Retrieved from the Internet, accessed Apr. 22, 2021, pp. 1-2 <https://www.secplicity.org/2016/09/12/usb-lock-screen-bypass-daily-security-byte/>.

Gaul, "Cyber Security Market Statistics—2027," AlliedMarketResearch.com, Retrieved from the Internet, accessed Apr. 22, 2021, pp. 1-13 <https://www.alliedmarketresearch.com/cyber-security-market>.

Mell, Peter, et al., "The NIST Definition of Cloud Computing", NIST Special Publication 800-145, Sep. 2011, Gaithersburg, MD, 7 pgs.

* cited by examiner

INPUT/OUTPUT INTERFACE SECURITY

BACKGROUND

Computer systems can include input/output interfaces that can be characterized by an input/output port that facilitates attachment of a hardware device, as well as operating system software that defines protocols to control connection of a host to an attached hardware device and subsequent data communications between host and hardware device.

Input/output interface protocols can configure certain devices at startup or when they are plugged in at run time. Input/output interface protocols can permit a host to recognize an attached device at start up or on attachment at runtime. In the example of Universal Serial Bus (USB), hardware devices are divided into various device classifications in the form of device classes for quick handling. Each USB device class defines common behavior and/or protocols for devices serving similar functions. Examples and corresponding classes include: (i) video monitor (display class); (ii) modem (communications class); (iii) speakers (audio class); (iv) hard drive (mass storage class); and (v) data glove (human interface device (HID) class). The USB HID class consists primarily of devices that are used by humans to control the operation of computer systems. Typical examples of USB HID class devices include: (i) keyboards, computer mice, pointing devices, trackballs, and joysticks; (ii) controls such as remote controls, games, simulation devices (data gloves, throttles, steering wheels, and pedals); and (iii) other input devices including: bar-code readers, thermometers, or voltmeters.

Data structures have been employed for improving operation of computer systems. A data structure refers to an organization of data in a computer environment for improved computer system operation. Data structure types include containers, lists, stacks, queues, tables, and graphs. Data structures have been employed for improved computer system operation, e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: examining hardware device transmitted data received through an I/O interface port of a computer system; determining in dependence on the examining whether the hardware device transmitted data received through the I/O interface port of the computer system satisfies a criterion; and in response to determining that the hardware device transmitted data received through the I/O interface port of the computer system satisfies the criterion, initiating a security process for protecting the computer system.

Implementations may include one or more of the following features. The computer implemented method where the determining in dependence on the examining whether the hardware device transmitted data received through the I/O interface port of the computer system satisfies the criterion can include determining whether the hardware device transmitted data specifies a human interface device classification. The determining in dependence on the examining whether the hardware device transmitted data received through the I/O interface port of the computer system satisfies the criterion can include determining whether the hardware device transmitted data matches a signature string. The method can include ascertaining that the computer system is in a locked operating state, and where determining in dependence on the examining whether the hardware device transmitted data received through the I/O interface port of the computer system satisfies the criterion is performed in response to ascertaining. The method can include ascertaining a security risk status of the computer system and selecting one or more action of the security process in dependence on the identifying. Actions of the security process include one or more of the following selected from the group may include (a) disabling the I/O interface port, (b) outputting at least one notification, (c) producing an audit trail of a detected attack, and (d) destroying an external device that has transmitted the hardware device transmitted data. The method can include determining a security risk level of the computer system and installing an installation package on the computer system in response to the security risk level satisfying a threshold, where the installation package provisions the computer system to perform the (i) determining that the hardware device transmitted data received through the I/O interface port of the computer system satisfies the criterion, and (ii) initiating the security process for protecting the computer system. The method can include installing an installation package on the computer system during runtime of the computer system, where the installation package can include user application layer software code that modifies behavior of an operating system of the computer system so that the operating system performs the (i) determining that the hardware device transmitted data received through the I/O interface port of the computer system satisfies the criterion, and (ii) initiating the security process for protecting the computer system. Initiating the security process can include initiating a security process where the computer system, in response to the criterion being satisfied, loads a custom security driver that supports communications with an external device that has transmitted the hardware device transmitted data, where the custom security driver, subsequent to the criterion being satisfied (i) sends data request communications to the external device that emulate operation of a device driver loaded for support of an authorized hardware device; (ii) receives in response to the data request communications subsequent data from the external device, and (iii) initiates creation of an audit file record recording the subsequent data, where the custom security driver restricts presentment of command data defined by the subsequent data to a command handler interface of the computer system. Initiating the security process can include initiating a security process where the computer system, in response to the criterion being satisfied, loads a custom security driver that supports communications with an external device that has transmitted the hardware device transmitted data, where the custom security driver, subsequent to the criterion being satisfied is operational for (i) sending an amount of electrical energy to the external device that is sufficient to overload the external device; (ii) transmitting to the external device a request for return data; (iii) monitoring for receipt of the requested return data; and (iv) iteratively performing the sending, the transmitting, and the monitoring until the return data is determined to be not received by the monitoring. The security process can include disabling the I/O interface port, and where the disabling the I/O interface port can include one or more of the following selected from the group may include: (i) configuring the computer system to ignore transmitted data of an external device that has transmitted the hardware device transmitted data, even where the transmitted data is compliant with a format required of an I/O interface associated to the I/O interface port; (ii) restricting the computer system from presenting a descriptive data request to an attached hardware device; (iii) restricting launch of a device driver for facilitating communication with the attached hardware device, and (iv) restricting delivery of electrical power for powering the attached hardware device. Initiating the security process can include producing an audit trail record, where the audit trail record can include a video data representation of the I/O interface port at a time of the determining that the hardware device transmitted data received through the I/O interface port of the computer system satisfies the criterion, and where the audit trail record can include a timestamp specifying a time of the determining that the hardware device transmitted data received through the I/O interface port of the computer system satisfies the criterion. Determining whether the hardware device transmitted data received through the I/O interface port of the computer system satisfies the criterion is selectively performed while the computer system is in a locked operating state. Initiating a security process for protecting the computer system can include initiating first security actions in dependence on an ascertaining that a first security risk level is associated to the computer system, and where the method can include, in a subsequent iteration of the determining and the initiating, initiating second security actions in dependence on an ascertaining that a second security risk level is associated to the computer system, the second security risk level being increased relative to the first security risk level, the second security actions being more expansive than the first security actions. Implementations of the described techniques may include hardware, a method or process, or computer software on a computer-accessible medium.

In another aspect, a computer program product can be provided. The computer program product can include a computer readable storage medium readable by one or more processing circuit and storing instructions for execution by one or more processor for performing a method. The method can include, for example: examining hardware device transmitted data received through an I/O interface port of a computer system; determining in dependence on the examining whether the hardware device transmitted data received through the I/O interface port of the computer system satisfies a criterion; and in response to determining that the hardware device transmitted data received through the I/O interface port of the computer system satisfies the criterion, initiating a security process for protecting the computer system.

In a further aspect, a system can be provided. The system can include, for example, a memory. In addition, the system can include one or more processor in communication with the memory. Further, the system can include program instructions executable by the one or more processor via the memory to perform a method. The method can include, for example: examining hardware device transmitted data received through an I/O interface port of a computer system; determining in dependence on the examining whether the hardware device transmitted data received through the I/O interface port of the computer system satisfies a criterion; and in response to determining that the hardware device transmitted data received through the I/O interface port of the computer system satisfies the criterion, initiating a security process for protecting the computer system.

Additional features are realized through the techniques set forth herein. Other embodiments and aspects, including but not limited to methods, computer program products and systems, are described in detail herein and are considered as a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
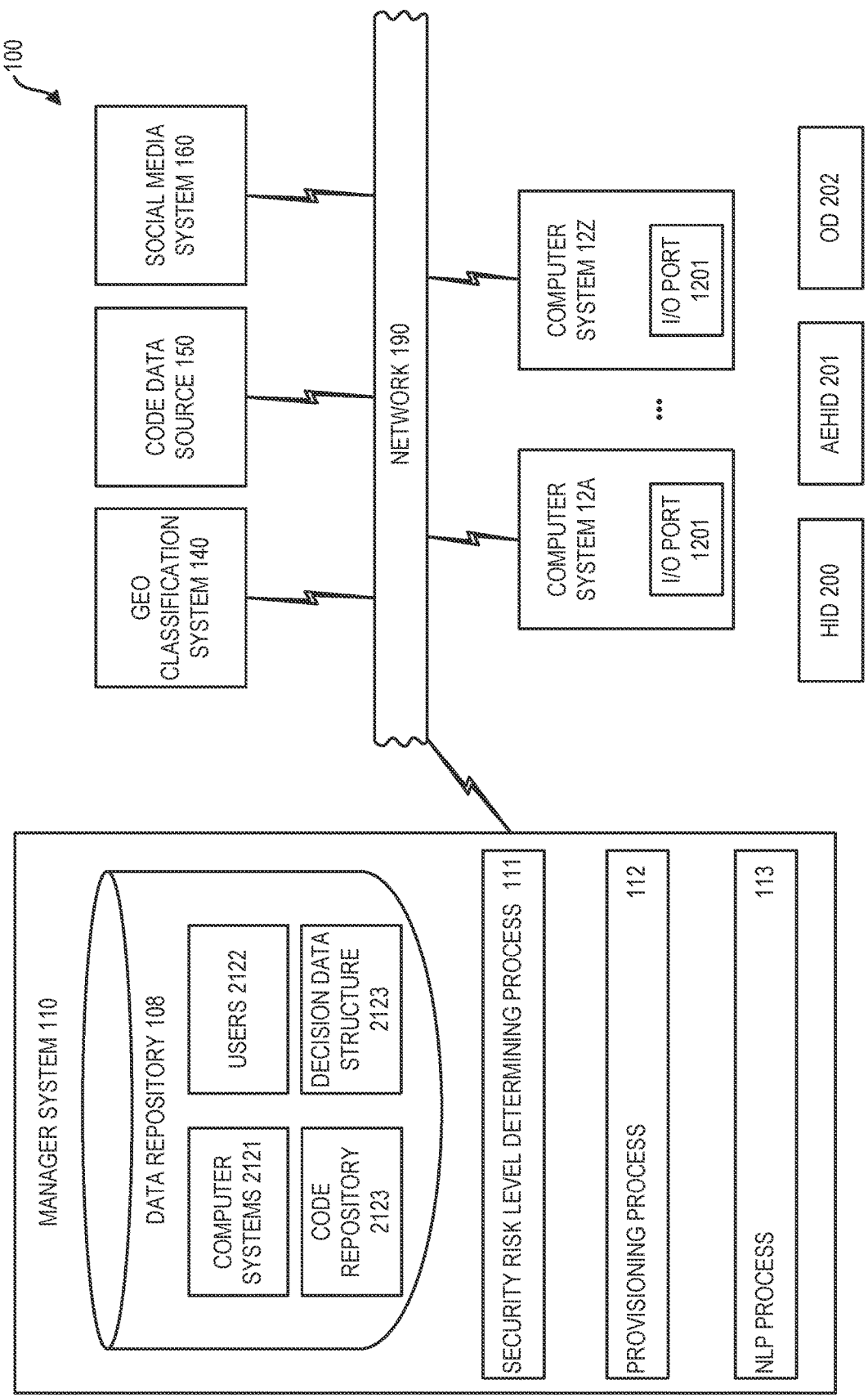
FIG. 1 depicts a system having a manager system, computer systems, a geo classification system, a code data source, and a social media system according to one embodiment.

System 100 for use in protecting a computer system is shown in FIG. 1. System 100 can include manager system 110 having associated data repository 108, computer systems 12A-12Z, geo classification system 140, code data source 150, and social media system 160. Manager system 110, computer systems 12A-12Z, geo classification system 140, and social media system 160 can be in communication with one another via network 190. System 100 can include numerous devices which can be computing node based devices connected by network 190. Network 190 can be a physical network and/or a virtual network. A physical network can include, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network.

In one embodiment, manager system 110 can be external to computer systems 12A-12Z, geo classification system 140, code data source 150, and social media system 160. In one embodiment, manager system 110 can be co-located with one or more of computer systems 12A-12Z, geo classification system 140, code data source 150, and social media system 160.

Different ones of computer systems 12 can be associated to a different user. The different users can be associated to different enterprise entities. Respective computer systems of computer systems 12A-12Z can be provided by a variety of different types of computing node-based devices, e.g., a personal computer, laptops, data center servers, fixed mount data collection devices, mobile devices, e.g., smartphones or smartwatches, and the like. Respective computer systems of computer systems 12A-12Z can include I/O interface ports 1201 which define with operating system level software respective I/O interfaces of computer systems 12A-12Z.

A variety of different types of hardware devices can be detachably attached to I/O interface port 1201 including, e.g., a human interface device (HID) device, e.g., a keyboard or mouse, an adversarial emulated human interface device (AEHID) 201, or other device (OD) 202, e.g., a mass storage device, a printer, monitor, or the like. Embodiments herein provide security protection to computer systems of computer systems 12A-12Z against adversarial attacks using an adversarial hardware device, which in one embodiment can be provided by an adversarial hardware device according to AEHID 201.

Embodiments herein recognize that according to one type of adversarial attack, the provider of AEHID 201 can configure AEHID 201 to emulate the behavior of an HID, such as a keyboard, to transmit keystroke data defining malicious commands to a computer system of computer systems 12A-12Z, and transmit malicious data of other forms.

Data repository 108 of manager system 110 can store various data. In computer systems area 2121, data repository 108 can store data on computer systems 12A-12Z of system 100, including data respecting, e.g., registration status, provisioning state, associated enterprise entity owner, associated enterprise entity users, and historical security risk level.

In users area 2122, data repository 108 can store data on users of system 100 which user can be associated to computer systems 12. Users of system 100 can include enterprise entity users including general agent enterprise entity users, enterprise entity administrator users, and enterprise entity owner users. User data can include contact information of users of system 100 including messaging system address contact information to facilitate transmission of messaging of notifications to individual enterprise entity users.

In code repository 2123, data repository 108 can store software code for provisioning of computer systems 12A-12Z. Code repository 2123 can store installation packages, including, e.g., libraries and executable code.

Manager system 110 can run various processes. Manager system 110 can run security risk level determining process 111, provisioning process 112, and natural language process (NLP) 113.

Manager system 110 running security risk level determining process 111 can include manager system 110 applying a multi-factor formula to determine a security risk associated to computer systems of computer systems 12A-12Z.

System 100 can be configured so that manager system 110 running security risk level determining process 111 determines a security risk level associated to respective computer systems 12A-12Z and iteratively pushes a security risk level parameter value specifying a determined security risk level to respective ones of computer systems 12A-12Z. In one embodiment, a current security risk level of each respective computer system of computer systems 12A-12Z can be iteratively determined by iterative running of security risk level determining process 111, so that a current security risk level of each respective computer systems 12A-12Z can always be available and subject to query. The security risk level parameter value specifying a security risk associated to respective computer systems 12A-12Z can be dependent on one or more factor, e.g., a geolocation factor, a application data factor, a file data factor, a crowd density factor, a user factor, and/or other factors.

On the determination that certain one or more criterion has been satisfied, manager system 110 can return an action decision specifying that one or more computer system of computer systems 12A-12Z is to be provisioned to include a software package stored in code repository 2123. Manager system 110 running provisioning process 112, in response to a determination that a certain computer system of computer systems 12A-12Z is to be provisioned, can send an installation package for installation on the respective computer system of computer systems 12A-12Z targeted for provisioning. Functions and processes herein are described with reference to computer system 12 set forth in FIG. 2, which can represent any computer system of computer systems 12A-12Z which has been selected and targeted for provisioning and for performance of functionality according to processes 2141-2145 set forth in reference to FIG. 2.

Figure 2:
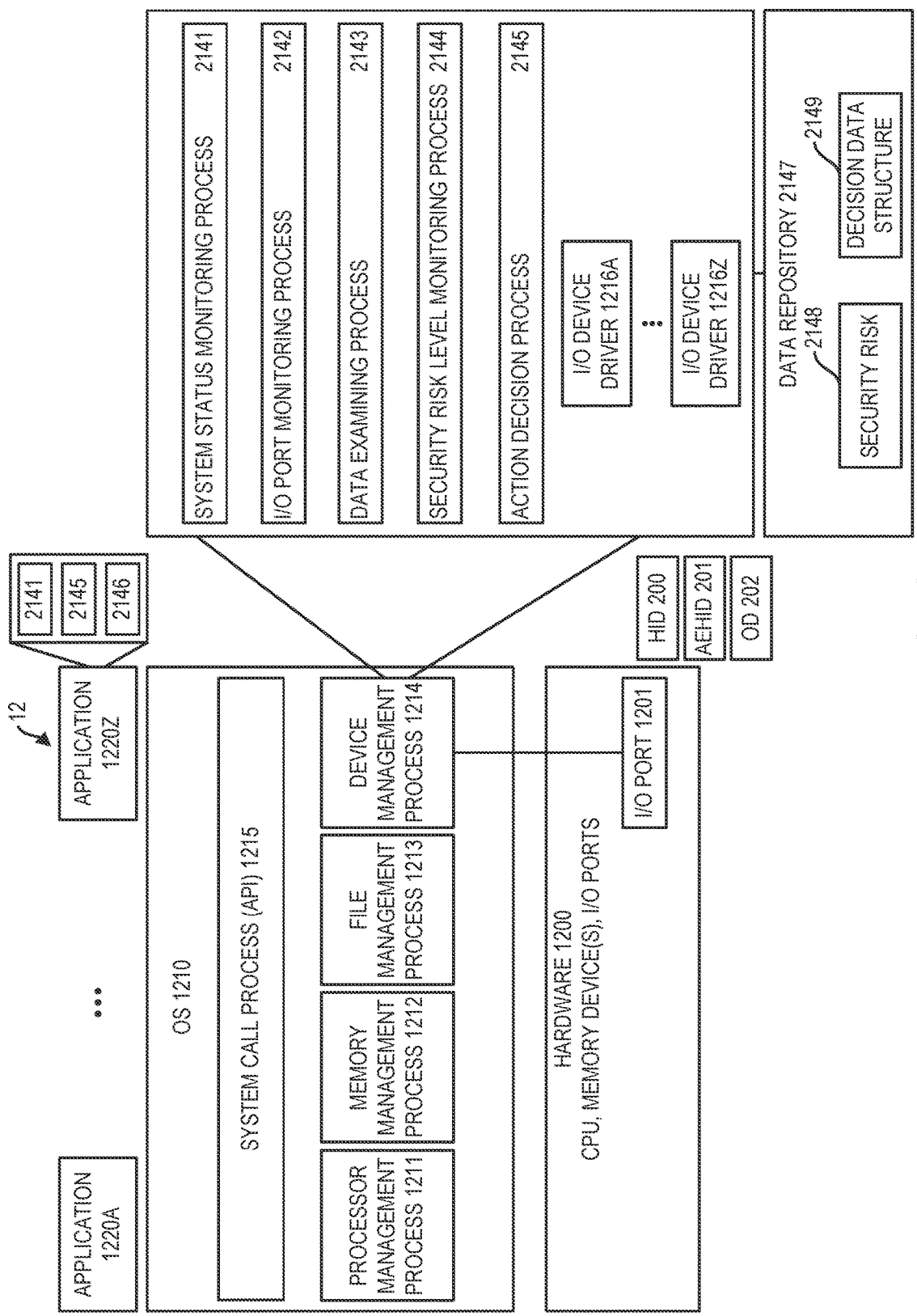
FIG. 2 is a schematic view of a computer system according to one embodiment.

Embodiments herein recognize that computer systems having input/output interfaces can be vulnerable to hardware-based attacks by an adversary. With reference to FIG. 2, there is shown a schematic representation of computer system 12 having operating system (OS) 1210 running on computer system hardware 1200, which computer system hardware 1200 can include, e.g., one or more processor, one or more memory device, and one or more I/O interface port. OS 1210 can run various processes, e.g., processor management process 1211, memory management process 1212, file management process, device management process 1214, and system call process 1215 which among other functions can permit OS 1210 to interact with applications 1220A-1220Z running on OS 1210. System call process 1215 can define an application program interface (API).

Processor management process 1211 can perform, e.g., scheduling, tracking status of a processor, tracking status processor program-based processes, allocating of a processor, and de-allocating of a processor. Memory management process 1212 can perform various processes such as providing main memory fast storage, and various main memory processes, such as maintaining track of primary memory, making determinations as to which program process can access memory allocating memory, and de-allocating memory. File management process 1213 can include, e.g., keeping track of statuses of file data, allocating access to file data, and de-allocating access to file data. OS 1210 running device management process 1214 can include OS 1210 keeping track of all devices in communication with OS 1210, determining which program-based process can obtain access to a device, allocating devices and de-allocating devices.

For configuring computer system 12 to perform security protections as set forth herein, computer system 12 can run a variety of particularly adapted processes including system status monitoring process 2141, I/O interface port monitoring process 2142, data monitoring process 2143, security risk level monitoring process 2145, and action decision process 2145. In one embodiment, system status memory monitoring process 2141, I/O interface port monitoring process 2142, data monitoring process 2143, security risk level monitoring process 2145, and action decision process 2145 can be performed by OS 1210.

OS 1210 running system status monitoring process 2141 of device management process 1214 can include OS 1210 ascertaining whether 1210 is currently in a locked (idle) state of operation. According to one embodiment, OS 1210 can be configured to enter a locked state of operation in response to a timeout occurring when user defined data is received by computer system 12 within a threshold period of time. According to one aspect of a locked operating state, a locked operating state can be characterized by OS 1210 logging out a current authorized user who is logged on to computer system 12 and requiring re-logging in for access by the authorized user to functionalities of computer system 12. OS 1210 can be configured so that entry of a lockout operating state triggers various actions by one or more processor management process 1211, memory management process 1212, file management process 1213, and/or device management process 1214.

OS 1210 running system call process 1215 can include OS 1210 responding to system calls, e.g., system calls that can be presented to OS 1210 by one or more application of user applications 1220A-1220Z.

OS 1210 running system status monitoring process 2141 can include OS 1210 determining whether OS 1210 is currently in a locked operating state. OS 1210 running I/O interface port monitoring process 2142 can include device management process 1214 detecting whether a hardware device has been connected to I/O interface port 1201. Candidate hardware devices that can be attached to I/O interface port 1201 include, e.g., human interface device (HID) 200, an adversarial emulated human interface device (AEHID) 201, or other device (OD) 202, e.g., a mass storage device, printer, monitor, or the like.

According to one embodiment, OS 1210 by device management process 1214 can be configured so that in response to sensing that a hardware device has been attached to I/O interface port 1201, device management process 1214 sends request data to the attached hardware device requesting the attached hardware device to transmit to computer system 12 descriptive data that specifies capabilities of the attached hardware device. In the context of USB, such descriptive data can be in the form of a USB descriptor.

OS 1210 running data monitoring process 2143 by a device management process can include OS 1210 by device management process 1214 examining data including descriptive data received from an attached hardware device attached to I/O interface port 1201 that specifies capabilities of the attached hardware device. The examining of hardware device transmitted data by a data examining process can be in response to a request for descriptive data sent by I/O interface port monitoring process 2142.

OS 1210 running security risk level monitoring process 2144 can include OS 1210 by device management process 1214 monitoring the current security risk level associated to computer system 12. Performance of security risk level monitoring process 2144 can include query of an iteratively updated security risk level parameter value that specifies a level of a determined security risk associated to a computer system 12. In one embodiment, as explained with reference to FIG. 1, system 100 can be configured so that manager system 110 can iteratively determine, by running security risk level determining process 111, a security risk associated to computer systems 12A-12Z, and can iteratively push one or more parameter value specifying a determined level of security risk to computer systems 12A-12Z for storage into respective instances of data repository 2147 associated to respective ones of computer systems 12A-12Z. Instances of data repository 2147 can include security risk area 2148 for storing a security risk level parameter value specifying a current security risk associated to computer system 12.

In another aspect, OS 1210 running action decision process 2145 can include OS 1210 by device management process 1214 returning action decisions that specify attributes of one or more attribute of the security process.

In one embodiment, OS 1210 running action decision process 2145 can return action decisions in dependence on a monitored security risk level ascertained by security risk level monitoring process 2144. According to one embodiment, action decisions returned by action decision process 2145 can include, e.g., disabling I/O interface port 1201, executing camera software to capture video data, sending a push notification to the computer owner's wearables, sending a notification to administrators, triggering a sound alert, and/or destroying a hardware device attached to I/O interface port 1201.

OS 1210 can include a plurality of I/O drivers 1216A-1216Z. One of the plurality of drivers can be activated in response to a hardware device being attached to I/O interface port 1201. I/O interface port 1201 can be configured to receive a plurality of different types of devices. For example, I/O interface port 1201 can receive a human interface device (HID) 200, which can be a keyboard or a mouse. In another, I/O interface port 1201 can receive other device (OD) 202 which can be any one of a number of different forms, e.g., a display for a storage device. In another aspect, I/O interface port 1201 can receive an adversarial emulated human interface device (AEHID) 201 which poses a security threat to computer system 12. In one aspect, OS 1210 can be configured to activate one of a plurality of drivers 1216A-1216Z depending on a detected device attached to I/O interface port 1201. In some use case situations, the candidate driver of drivers 1216A-1216Z can be pre-existing on operating system OS 1210. In another use case scenario, OS 1210 can determine that a required driver is missing from OS 1210 and can make a system call to retrieve an appropriate driver from a managed network connection of network 190, e.g., from code data source 150. Referring to FIG. 1, computer systems 12A-12Z can include one or more I/O interface ports 1201 which can be configured to detachably receive an external hardware device. The external hardware device can include, e.g., a human interface device (HID) 200, an emulated human interface device (AEHID) 201, or other device (OD) 202. The other device (OD) 202 can include, e.g., a storage device or a display. According to aspects herein, an unscrupulous party may mount an attack on a computer device using AEHID 201, which emulates the functionality of HID 200. Embodiments herein recognize that OS 1210 can be preconfigured to include native I/O driver 1216A for support of HID 200.

In one embodiment, computer system 12 as shown in FIG. 2 can include a Universal Serial Bus (USB) compliant input/output interface defined by functions of device management process 1214 and I/O interface port 1201 configured as a USB I/O interface port. Universal Serial Bus™ and USB™ are trademarks of the USB Implementers Forum. Universal Serial Bus (USB) is an industry standard that establishes specifications, e.g., for connectors, cables, and protocols for communication between and power supply between computers, peripherals, and other computers. USB was developed by a consortium of a plurality of enterprises with the goal of making it fundamentally easier to connect external devices to personal computers. Embodiments herein recognize that USB interfaces are subject to USB human interface device (HID) spoofing attacks. Embodiments of I/O interfaces set forth herein can be compliant with USB Specifications documentation for Release USB 1.0 through Release USB4.

Figure 3:
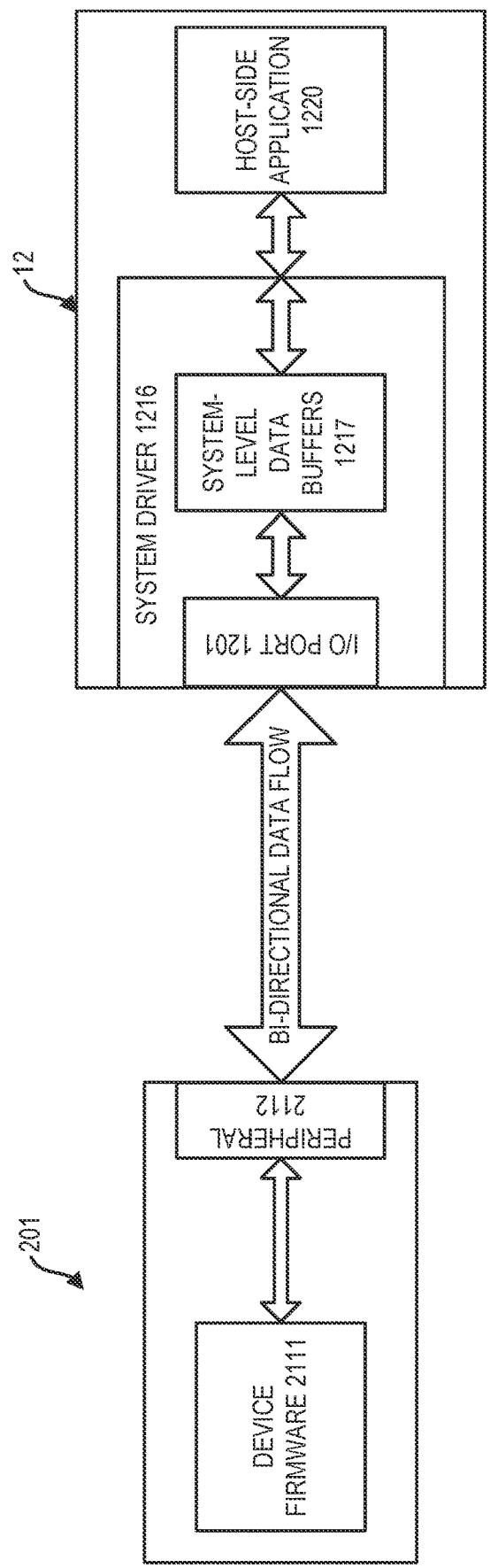
FIG. 3 is a system diagram illustrating a hardware-based security attack according to one embodiment.

FIG. 3 is a schematic diagram illustrating features of a hardware attack that may be launched by an adversary. Features set forth herein can protect computer system 12 from certain hardware-based attacks. As shown in FIG. 3, as are set forth herein, AEHID 201 can include device firmware 2111, and peripheral hardware 2112, which peripheral hardware 2112 can permit attachment of AEHID 201 to I/O interface port of computer system 12. Computer system 12 can include one or more host side application 1220, I/O interface port 1201, and system driver 1216 having associated system-level data buffers 1217 providing communication between a hardware device attached to I/O interface port 1201 and OS 1210.

Within firmware 2111 of AEHID 201 an attacker can falsely encode descriptive data specifying that AEHID 201 is a hardware device qualified for authorization device. Firmware 2111, in one embodiment, can include, e.g., an EEPROM having EEPROM memory space. Within device firmware 2111, an attacker can further falsely encode keystroke data defining malicious commands for presentment of malicious code that can be transmitted to computer system 12. Upon authorization of AEHID 201 by computer system 12, computer system 12 can load a device driver facilitating communication between OS 1210 and the attached hardware device. With access to computer system 12 permitted, the hardware device can send malicious data in the form, e.g., of malicious keystrokes defining malicious commands, and other malicious data including malicious code data defined by file data permitted to be transferred to computer system 12, upon the authorization by a computer system of AEHID 201.

In one embodiment, computer system 12 as shown in FIG. 2 can include a Universal Serial Bus (USB) compliant input/output interface defined by functions of device management process 1214 and I/O interface port 1201 configured as a USB I/O interface port. Embodiments herein recognize USB enabled operating systems can be particularly vulnerable to the described hardware attacks. In particular, embodiments herein recognize that USB enabled operating systems including a USB enabled device management system even in a computer system locked state of operation may routinely authorize an unauthorized hardware device that emulates the operation of an HID qualified for authorization.

In one embodiment, computer system 12 can include various features, e.g., features as set forth in reference to processes 2141-2145 that provide various protections to computer system 12 with respect to adversarial use of AEHID 201.

Embodiments herein recognize that computer systems having input/output interfaces can be susceptible to a particular type of hardware attack in which an adversary produces an adversarial hardware device that emulates the operation of a hardware device qualifying for authorization. Embodiments herein recognize, for example, that an adversary may produce an adversarial hardware device that emulates the behavior of a device, e.g., HID, e.g., a keyboard, that is configured to produce emulated keystrokes. The emulated keystrokes can be configured, e.g., to generate system level commands or other malicious data designed, e.g., to destroy host computer system hardware/and or software, or syphon system software. If device management process 1214 recognizes the unauthorized hardware device to be a keyboard, the device management process can erroneously authorize the adversarial device and permit the reception and process of emulated keystrokes that include system level commands.

Manager system 110 can run natural language processing (NLP) process 113 for determining one or more NLP output parameter of a message. The NLP process can include one or more of a topic classification process that determines topics of messages and output one or more topic NLP output parameter, a sentiment analysis process which determines sentiment parameter for a message, e.g., polar sentiment NLP output parameters, "negative," "positive," and/or non-polar NLP output sentiment parameters, e.g., "anger," "disgust," "fear," "joy," and/or "sadness" or other classification process for output of one or more other NLP output parameters, e.g., one of more "social tendency" NLP output parameter or one or more "writing style" NLP output parameter.

By running of the described NLP process, manager system 110 can perform a number of processes including one or more (a) topic classification and output of one or more topic NLP output parameter for a received message, (b) sentiment classification and output of one or more sentiment NLP output parameter for a received message, or (c) other NLP classifications and output of one or more other NLP output parameter for the received message.

Topic analysis for topic classification and output of NLP output parameters can include topic segmentation to identify several topics within a message. Topic analysis can apply a variety of technologies, e.g., one or more Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment, sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Geo classification system 140 can associate venues to spatial coordinate ranges associated to the venues. Geo classification system 140 can include enhanced spatial maps pre-marked with tags to indicate uses associated with map features. Map features can include venues having associated venue areas including venue building areas and/or associated venue parking areas. An enhanced map can include tag specifying usage classifications of venues, e.g., residential, business, public, and the like. An enhanced map can be tagged to tag features of a map including, e.g., roads, bodies of water and infrastructure features such as building walls (exterior and interior) defining enterprise venues. In some cases, an enhanced map can be tagged so that that different parts of a building are tagged differently, e.g. a doorway can be tagged differently from a conference room. Geo classification system 140 can provide data tags associated to locations that specify uses associated with various locations. Geo classification system 140 can cognitively map venues identified by venue identifiers, e.g., names, addresses, classifications, and the like, to coordinate location ranges associated to the various venues. Accordingly, manager system 110 querying geo classification system 140, with location data in the form of coordinate location data, can return an identifier venue. Further, geo classification system 140 can cognitively map venues that are listed in a geo-classification system with uses associated with such venues, e.g., whether such venues are for residential use or business use, can specify the type of business use, and include a variety of additional or alternative use classifications, e.g., public use, roadway use, waterway use, and the like. An enhanced map can be tagged to tag features of a map, including, e.g., roads, bodies of water, and venues. Venues can be provided, e.g., by open spaces, such as developed open spaces or undeveloped open spaces, buildings such as open roof building or closed roof buildings, and/or open spaces associated to buildings, such as buildings associated with a parking lot. For each venue, geo classification system 140 can associate, e.g., identifiers for the venue, ranges, and coordinate locations associated with the venue, features associated to the venue, such as building infrastructure features, parking lot features, and other features. Geo classification system 140, according to one embodiment, can be provided by GOOGLE MAPS® (GOOGLE MAPS® is a registered trademark of Google, Inc.).

Social media system 160 can include a collection of files, including, for example, HTML files, CSS files, image files, and JavaScript files. Social media system 160 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that have minimal or no social network attributes. A messaging system can be provided by a short message system (SMS) text message delivery service of a mobile phone cellular network provider or an email delivery system. Manager system 110 can include a messaging system, in one embodiment. During a process of registration wherein a user of system 100 registers as a registered user of system 100, a user sending registration data can send with permission data defining the registration data a permission that grants access by manager system 110 to data of the user within social media system 160. On being registered, manager system 110 can examine data of social media system 160, e.g., to determine whether first and second users are in communication with one another via a messaging system of social media system 160. A user can enter registration data using a user interface displayed on a computer system of computer systems 12A-12Z. Entered registration data can include, e.g., name, address, social media account information, other contact information, biographical information, background information, preferences information, and/or permissions data, e.g., can include permissions data allowing manager system 110 to query data of a social media account of a user provided by social media system 160 including messaging system data and any other data of the user. When a user opts-in to register into system 100 and grants system 100 permission to access data of social media system 160, system 100 can inform the user as to what data is collected and why, that any collected personal data may be encrypted, that the user can opt out at any time, and that if the user opts out, any personal data of the user is deleted.

Figure 4:
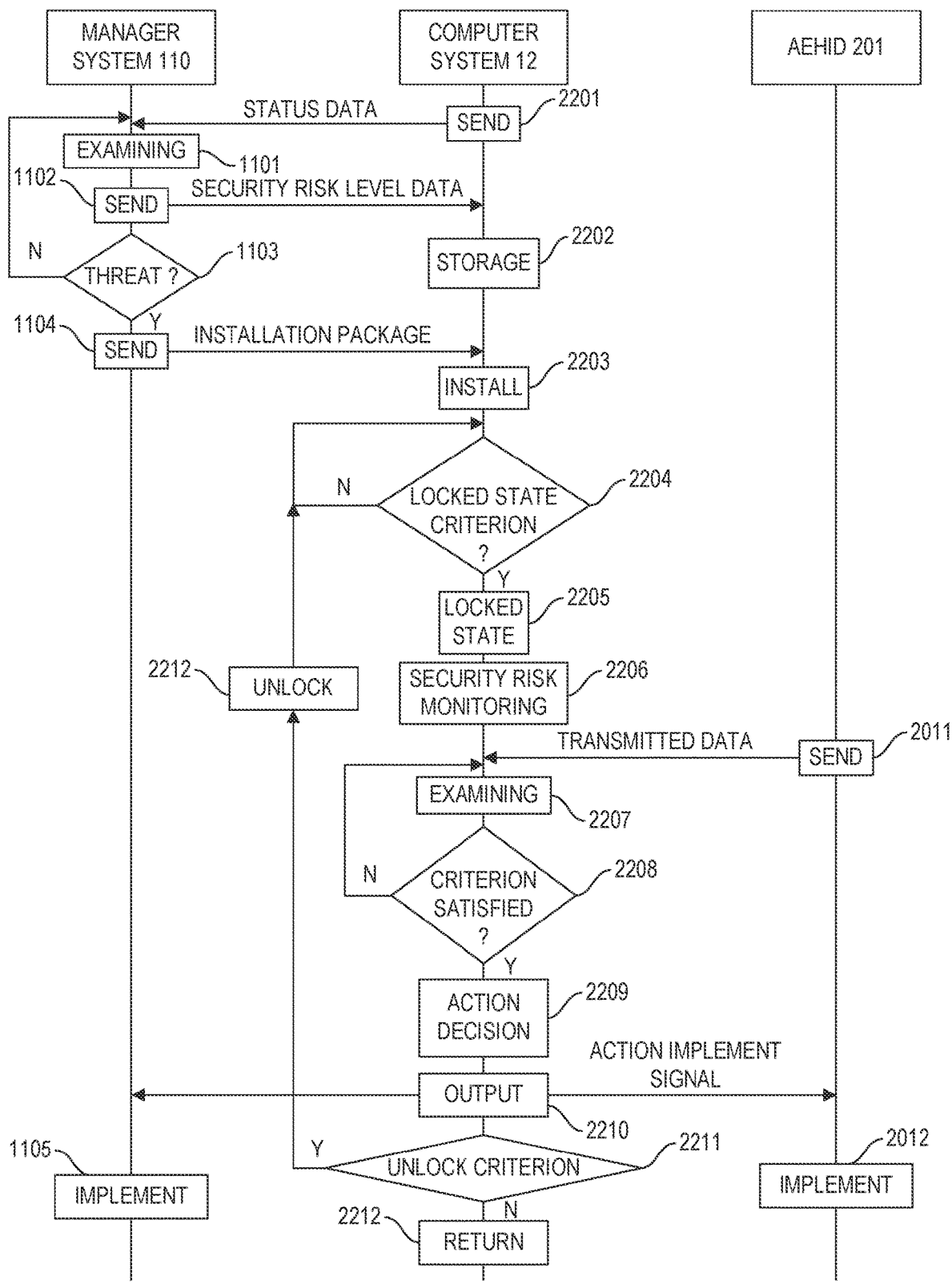
FIG. 4 is a flowchart illustrating a method for performance by a manager system interoperating with other components according to one embodiment.
Figure 5:
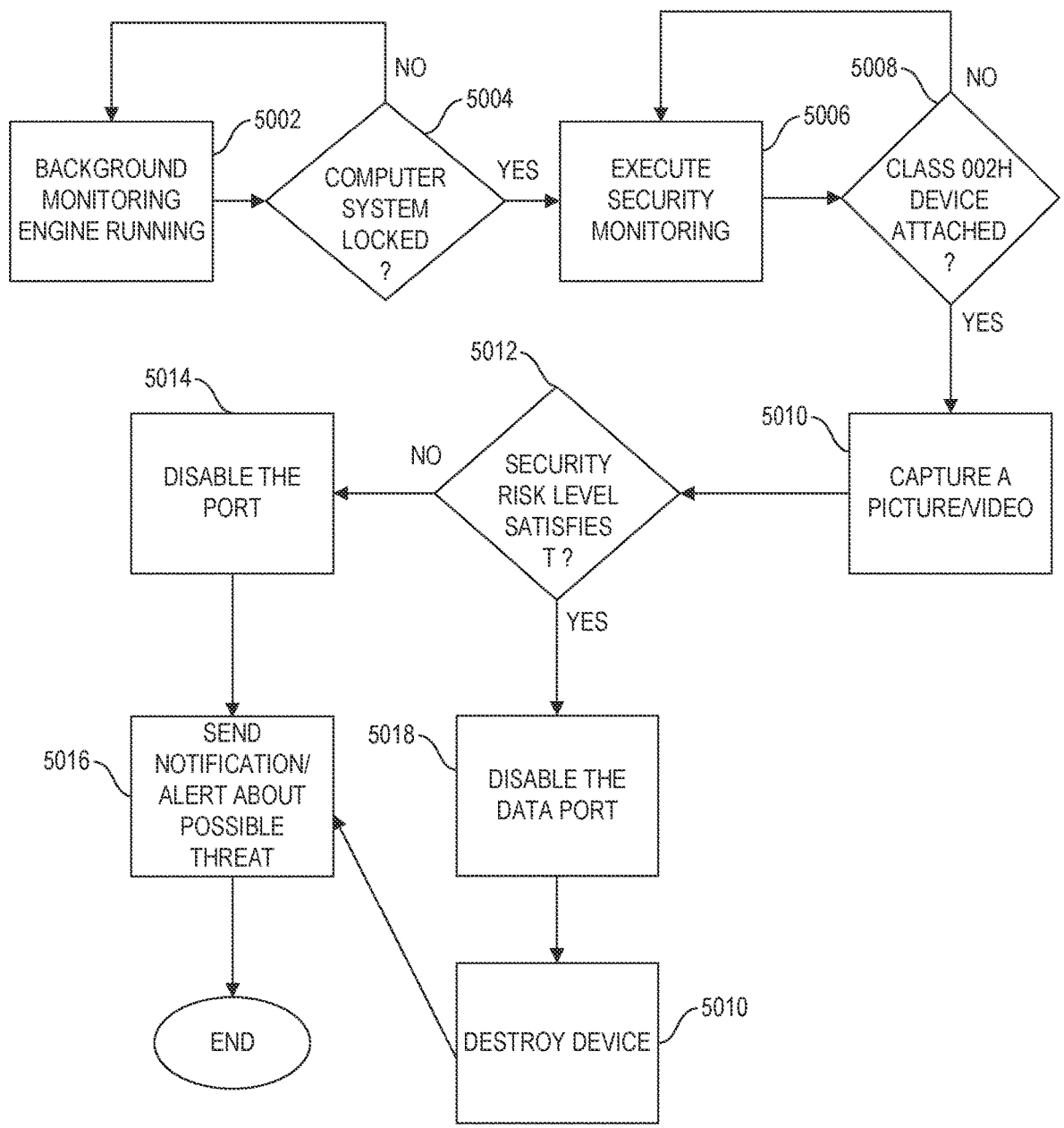
FIG. 5 is a flowchart illustrating a method for performance by a manager system according to one embodiment.

A method for performance by computer systems 12A-12Z interoperating with manager system 110 and an adversarial AEHID 201 is set forth in reference to the flowchart of FIG. 4, and a method for performance by computer system 12 is set forth in reference to the flowchart of FIG. 5.

At block 2201, computer system 12 can be sending status data for examining by manager system 110, and at block 1101, manager system 110 can be examining the received status data. Status data can be status data indicating a security risk associated to computer system 12. The status data can be any form of status data. In one example, the status data can be administrator user defined status data. For example, an administrator user associated to computer system 12 can ascertain by observation that a security threat is present and therefore can define status data indicating the security threat, and such status data can be sent at block 2201. In another example, the status data can be status data other than user defined status data. For example, the status data can include sensor data output by sensors associated to computer system 12 and can include, e.g., application data of applications running on a computer device and file data of files associated to computer system 12. Manager system 110 at examining block 1101 can perform examining of the received status data sent at block 2201.

The examining of status data sent at block 2201 can include examining status data to determine a current security risk associated to respective ones of computer systems 12A-12Z. In determining a security risk level, manager system 110 can apply the formula as set forth in Eq. 1.

$$S = F1\,W1 + F2\,W2 + F3\,W3 + F4\,W4 + F5\,W5 \qquad \text{(Eq. 1)}$$

Where S is the security risk level scoring parameter value score, F1-F5 are factors contributing to the security risk level scoring parameter value score, and W1-W5 are weights associated to the various factors. In one embodiment, F1 can be a geography factor, F2 is an application factor, F3 is a file data factor, F4 is a crowd density factor, and factor F5 is a user factor.

Regarding factor F1, manager system 110 applying factor F1 can use the decision data structure of Table A according to one embodiment. Manager system 110 can use security risk level values using the decision data structure of Table A.

TABLE A

| Row | Location coordinate range | Type classification | Security risk level |
|---|---|---|---|
| 1 | XX | Public Park | 0.2 |
| 2 | XX | Private residence of user | 0.1 |
| 3 | XX | Legal Business Office | 0.7 |
| 4 | XX | Medical business office | 0.7 |
| 5 | XX | Banking business office | 0.9 |
| ... | ... | | ... |

The decision data structure of Table A maps location coordinate ranges of venue type classifications to sensitivity levels. According to one embodiment, Table A can include predetermined security risk levels assigned to different types of classifications. For populating the decision data structure of Table A which can be stored in decision data structures area 2124 of data repository 108, manager system 110 iteratively during the deployment period of system 100 can query data of geo classification system 140 which can store iteratively updated information, e.g., on uses of different venues. Manager system 110, using the decision data structure of Table A, can assign security risk levels in dependence on a current location of computer system 12 and a user associated to such computer system 12. Using the decision data structure of Table A, manager system 110 can assign security risk levels according to factor F1 in dependence on the perceived likelihood of a hardware attack of the type herein. Manager system 110 can update the decision data structure of Table A by iteratively polling a news aggregator that reports actual historical locations of hardware attached using an I/O interface attached hardware device.

Regarding factor F2, manager system 110 can run NLP process 113 on returned status data in the form of text-based application data to return topic classifiers for content such as text content associated with each application stored on computer system 12, and can provide security risk level scores on return topics return by activation of running NLP process 113. For transforming extracted topics into security risk levels, manager system 110 can use Table B below. Text based application can include, e.g., text base source code defining application, as well as any documentation associated to such applications, including application program interface (API) documentation.

TABLE B

| Row | Topic | Security risk level score |
|---|---|---|
| 1 | XX | 0.2 |
| 2 | XX | 0.9 |
| 3 | XX | 0.7 |
| 4 | XX | 0.6 |
| ... | ... | ... |

Manager system 110 can provide an aggregate score for each application by aggregating security risk scores returned for portions of application data subject to natural language processing. Manager system 110 can then aggregate security risk scores for all applications stored on computer system 12 for return of an application data computer system security risk score. Manager system 110 can apply scoring values under factor F2 in proportion to the returned security risk score for applications stored on computer system 12.

Regarding factor F3, manager system 110 can run NLP process 113 on returned text-based file data status data to return topic classifiers for content such as text content associated with each file stored on computer system 12 and can provide classification based on return topics returned by activation of running NLP process 113. For transforming extracted topics into security risk levels, manager system 110 can use Table B above.

Manager system 110 can provide an aggregate score for each file by aggregating security risk scores returned for portions of file data subject to natural language processing. Manager system 110 can then aggregate security risk scores for all files stored on computer system 12 for return of a file data computer system security risk score. Manager system 110 can apply scoring values under factor F3 in proportion to the returned security risk score for applications stored on computer system 12. In one embodiment, the analysis of file data can be restricted to document file data and/or image file data.

For applying scoring values under factor F4, manager system 110 can query returned status data defined by sensor output data output by a crowd density sensor of computer system 12. In one embodiment, one or more sensor 27 of computer system 12 can be provided by a crowd density sensor. The crowd density sensor can be, e.g., infrared sensor base, acoustic based, and/or camera based. Manager system 110 can apply higher than baseline scoring value under factor F4 in the case that a higher than baseline crowd density has been sensed and can apply lower than baseline scoring value under factor F4 in the case that a lower than baseline crowd density has been sensed.

For applying scoring values under factor F5, manager system 110 can examine status data of recently authorized users of computer system 12, examine social connection data of such users from social media system 160, and assign scoring values under factor F5 in dependence on the social connection data. In one example, manager system 110 can apply scoring values under factor F5 in a manner that is inversely proportional to a number of connections of a user who are associated to the enterprise that is the enterprise owner of computer system 12.

Manager system 110, in response to the security risk level determining at block 1101, can perform sending a determined security risk parameter value at block 1102 to respective computer systems 12A-12Z. On receipt of the respective security risk parameter values. The respective computer systems 12A-12Z can store the security risk level parameter values at block 2202, e.g., into data repository 2147 of respective computer systems 12A-12Z. Manager system 110 can iteratively perform the loop of blocks 1101-1105 so that a security risk level of computer systems 12A-12Z can be iteratively determined and pushed to computer systems 12A-12Z throughout a deployment period of system 100.

Manager system 110, in response to the examining at block 1101, can perform threat detection at block 1103. At block 1103, in dependence on the examining performed at block 1101, manager system 110 can ascertain whether a threat has been detected. A threat can be detected, e.g., on the determination that the security risk parameter value determined by application of Eq. 1 satisfies a threshold, and/or on the condition that administrator user defined data has been received within the received status data sent at block 2201 specifying that the threat has been observed.

On the determination that a security threat has been detected for a selected one or more computer system of computer systems 12A-12Z, manager system 110 at send block 1103 can send an installation package for installation on the selected computer system represented as computer system 12 as shown in FIG. 2. For provisioning computer system 12 according to computer system 12 as set forth in FIG. 2, the installation package sent at block 1104 can include, e.g., libraries and executable code that define updates to operating system 1210 running on computer system hardware 1200 of computer system 12 as shown in FIG. 2. In response to the receipt of the installation package sent at block 1103, computer system 12 at block 2203 can install the installation package on computer system 12 to define an updated OS 1210 running on computer system hardware 1200 defining computer system 12.

In some embodiments, the installation package sent at block 1103 and installed at block 2203 can be provided by an operating system update. In such an embodiment, software code defining the installation package installed at block 2203 can be provided entirely by operating system level software code.

In some embodiments, the installation package sent at block 1103 and installed at block 2203 can include user application level software code defining an application of applications 1220A-1220Z, e.g., application 1220Z. In some embodiments, the installation package sent at block 1103 and installed at block 2203 can consist of user application level software code defining an application of applications 1220A-1220Z, e.g., application 1220Z.

In some embodiments, the installed installation package installed at block 2203 can include user application level software code that modifies the behavior of device management process 1214 through use of permitted system calls permitted by system call process 1215 as described in connection with FIG. 2. Providing an installable software package for installation at block 2203 so that the software application includes application level software code can facilitate rapid deployment of one or more computer system of computer systems 12A-12Z. In some embodiments, the installable software package installed at block 2202 for providing functionality according to processes 2141-2145 can be configured to be installed during runtime of computer system 12 without requiring shutdown and re-booting of computer system 12.

An application, e.g., an application modifying a behavior of OS 1210 can employ system calls. For example, system calls can include, e.g., a system call to query system status of computer system 12, a system call to query analog signal data of I/O interface port 1201, a system call to query descriptive data sent by an attached hardware device attached to I/O interface port 1201, a system call to control, e.g., disable I/O interface port 1201, a system call to restrict loading of a device driver, and other appropriate system calls for performance of one or more of system status monitoring process 2141, I/O interface port monitoring process 2142, data examining process 2143, security risk level monitoring process 2144, and action decision process 2145.

In some embodiments, software code defining the installation package sent at block 1103 and installed at block 2203 can include application level software code defining a user application 1220Z that implements one or more of security risk level monitoring process 2144 or action decision process 2145. Although system status monitoring process 2141, security risk level monitoring process 2144, and action decision process 2145 are referenced in FIG. 2 as operating system level processes, they can alternatively be performed as a user application level processes. In the embodiment where system status monitoring process 2141, security risk level monitoring process 2144, and action decision process 2145 are provided as application level processes, application 1220Z can be configured to present appropriate system calls to OS 1210 to perform security risk level monitoring process 2144 and action decision process 2145 and to modify the behavior of OS 1210.

With the installation package installed on computer system 12 at block 2203, computer system 12 can feature the updated functionalities described with reference to system status monitoring process 2141, I/O interface port monitoring process 2142, data monitoring process 2143, security level monitoring process 2145, and action decision process 2146.

On completion of install block 2203, computer system 12 can proceed to block 2204. At block 2204, computer system 12 by OS 1210 running security risk level monitoring process 2144 can ascertain whether a criterion for driving a computer device into a locked state has been satisfied. For example, computer system 12 by OS 1210 can ascertain whether a keyboard activity timeout has occurred, or whether an authorized user has requested a log out.

On determining that a locked state criterion has been satisfied at block 2205, OS 1210 of computer system 12 can proceed to block 2205 to drive computer system 12 into a locked state. In a locked state, computer system 12 can be locked so that computer system 12 will not be responsive to any input data that is input using a connected HID. In a locked state, OS 1210 can force log out of the currently logged in user and any subsequent user can be required to log in for entry of input data through a connected HID.

In response to driving computer system 12 into a locked state, OS 1210 of computer system 12 at block 2206 can perform security risk level monitoring. Security risk monitoring at block 2206 can include, in one embodiment, reading determined security risk values stored into security risk area 2148 of data repository 2147, which have been iteratively pushed from manager system 101 at block 1102. In one embodiment, security risk monitoring at block 2206 can include OS 1210 (or application 1220Z) determining current security risk level of computer system afresh by application of Eq. 1.

With a current security risk associated to computer system 12 ascertained at block 2206, computer system 12 can be receiving adversary presented hardware device transmitted data from an attached AEHID 201 that has been attached to I/O interface port 1201. The AEHID 201 can be sending hardware device transmitted data to computer system 12 at block 2011 on attachment of AEHID 201 to I/O interface port 1201.

In response to the receipt of the hardware device transmitted data sent at block 2011, computer system 12 at examining block 2207 can ascertain whether the hardware device transmitted data sent at block 2011 satisfies a criterion. In response to the receipt of the hardware device transmitted data sent at block 2011, according to a specific embodiment, computer system 12 at examining block 2207 can ascertain whether the hardware device transmitted data sent at block 2011 and received by computer system 12 matches signature data.

The signature data in the case of a USB compliant I/O interface can include the signature string: 002H, which is the string data specifying the device class HID. The emulated device AEHID 201 created by an adversary can be configured to send class data specifying class 002H to trick computer system 12 serving as USB host into determining that a legitimate HID 200 qualifying for authorization has been attached.

In one embodiment, the transmission of hardware device transmitted data at block 2011 can be preceded by certain handshaking data communications between AEHID 201 and the host defined by computer system 12. For example, in one implementation compliant with the USB specification in response to detection of an initial analog signal from AEHID 201, computer system 12 can send a request for descriptive data to AEHID 201 and at block 2011, AEHID 201 can send falsely encoded descriptive data describing the capabilities of AEHID 201 as being an HID 200 qualifying for authorization. In one aspect, computer system 12 by device management process 1214 can be configured so that on initial detection of an analog signal indicating attachment of a hardware device onto I/O interface port 1201, computer system 12 can send request data requesting return descriptive data by AEHID 201. In the case of a USB, the return descriptive data can be in the form of USB descriptor that describes capabilities of an attached hardware device. In the case that the attached hardware device is AEHID 201, the returned descriptive data returned at block 2011 can include false descriptive data that falsely represents the capacities of AEHID 201 and may falsely specify that AEHID 201 is a hardware device HID qualified for authorization.

In the context of USB, the transmitted data transmitted by AEHID 201 at block 2011 can assume a USB compliant format as indicated by Table C.

TABLE C

```
DeviceDesc =
{
  18,                   // bLength
  0x01,                 // bDescriptorType
  0x1001,               // bcdUSB
  0x00,                 // bDeviceClass
  0x00,                 // bDeviceSubClass
  0x00,                 // bDeviceProtocol
  EP0_PACKET_SIZE,      // bMaxPacketSize0
  0xC410,               // idVendor
  0x0001,               // idProduct
  0x0000,               // bcdDevice
  0x01,                 // iManufacturer
  0x02,                 // iProduct
  0x00,                 // iSerialNumber
  0x01                  // bNumConfigurations
}; //end of DeviceDesc
```

As set forth herein, an attacker can encode the data string 002H in the class descriptor field to emulate so that AEHID 201 emulates the operation of an HID 200. OS 1210 at block 2207 can perform monitoring of the hardware device transmitted data sent at block 2011 and at block 2208, in dependence on the examining at block 2207, can determine whether the sent data satisfies a criterion. In one embodiment, the satisfying criterion can be that the sent data includes data string data that matches a signature string. In one embodiment, the signature string can be the signature string 002H. Thus, in one embodiment, OS 1210 performing block 2208 can include OS 1210 ascertaining that received data string data received from an attached hardware device attached to I/O interface port 1201 matches the signature data string 002H.

Subsequent to and responsive to the determination that the described criterion referred to in reference to block 2208 has been satisfied, OS 1210 by device management process 1214 at block 2210 can initiate performance of a security process to protect computer system 12. The initiated security process can include one or more action. The one or more action can include, e.g., (A) disabling I/O interface port 1201, (B) outputting at least one notification, (C) producing an audit trail of a detected attack, and/or (D) destroying the attached hardware device.

In some embodiments, actions of the described security process can be independent of a determined current security risk level of computer system 12 and some embodiment actions of the described security process can be dependent on a determined current security risk level. In response to the signature data being recognized at block 2208, according to one embodiment, computer system 12 by OS 1210 can proceed to block 2209. At block 2209, OS 1210 can return an action decision. Alternatively, a responsive one or more action defining an initiated security process can be predetermined.

OS 1210 returning an action decision at block 2209 can include OS 1210 using the decision data structure as set forth in reference to Table D below. OS 1210 using the decision data structure of Table D can include OS 1210 returning different action decisions depending on a current security threat level determined by OS 1210 at block 2206. The action decision rendered at block 2209 can include one or more action.

TABLE D

| Row | Security risk level | Action(s) |
|---|---|---|
| 1 | 0.0 <= S < 0.5 | Disable I/O interface port 1201. |
| 2 | 0.5 <= S < 0.7 | Disable I/O interface port 1201; output notifications; generate audit report. |
| 3 | 0.8 <= S <= 0.9 | Disable I/O interface port 1201; output notifications; generate audit report including with use of host spoofing customized device driver. |
| 4 | 0.9 <= S <= 1.0 | Disable I/O interface port 1201; output notifications; generate audit report including with use of host spoofing customized device driver; destroy attached hardware device. |

The one or more action returned by performance of the action decision of block 2209 can include, e.g., (A) disabling I/O interface port 1201, (B) outputting at least one notification, (C) producing an audit trail of a detected attack, and (D) destroying the attached hardware device.

Disabling I/O interface port 1201 (A) can include one or more of the following actions: (i) configuring computer system 12 to ignore transmitted data of the attached hardware device attached to I/O interface port 1201; (ii) restricting the device management process from presenting a descriptive data request from an attached hardware device; (iii) restricting launch of a device driver for facilitating communication with the attached hardware device, and/or (iv) restricting delivery of electrical power for powering the attached hardware device.

Regarding action (i), configuring of computer system 12 to ignore received data transmitted from an attached hardware device can include OS 1210 of computer system 12 ignoring received data, even where received data is compliant with the required format associated to the I/O interface being controlled. Thus, in the case USB compliant I/O interface received data can be ignored, even where the received data has been formatted by the attached hardware device to be USB compliant.

Regarding (ii), restricting device management process 1214 from presenting descriptive data request from an attached hardware device, embodiments herein recognize that an I/O interface such as a USB compliant I/O interface can comprise controller-agent protocols, wherein an attached hardware devices can be restricted from sending its data unless there is a prior data request from a USB host. Regarding action (ii), OS 1210 can be configured so that subsequent to receipt of initial descriptive data from an attached hardware defined in the form of a descriptor matching the described signature data string, OS 1210 can be restricted from requesting additional descriptive data. For example, in the context of USB, device management process 1214, subject to detection of descriptive data matching the described signature string, can be restricted from requesting additional descriptive data in the form of report descriptors and configuration descriptive data in the form of configuration descriptors. Regarding (ii) OS 1210 by device management process 1214 can be configured to be restricted from presenting subsequent requests for descriptive data from an attached hardware device subsequent to determination at block 2208 (example of criterion satisfied) that a data string data of received data matches a signature data string. Regarding action (iii), restricting loading of a device driver for facilitating communication with the attached device, the restricting of loading can include restricting loading of a native device driver that is already resident on OS 1210 or can include restricting OS 1210 from requesting installation of a device driver from an external data source, e.g., code data source 150. Embodiments herein recognize that in the context of USB I/O interfaces, a specification compliant USB supports "plug and play" functionality with dynamically loadable and unloadable drivers. The user simply plugs the hardware device into the bus by attachment to an I/O interface port 1201. The host will detect this addition, interrogate the newly inserted device, and load the appropriate driver provided a driver is installed for your device. The end user is not required to provide configuration data with respect to, e.g., terminations, IRQs, and port addresses, or rebooting the computer. Once the user is finished, the user can remove the hardware device out of the I/O interface port, the host will detect its absence and automatically unload the driver. Regarding action (iii), the normal "plug and play" functionality is restricted, and OS 1210 can be restricted from loading a device driver for support of the newly attached hardware device.

Regarding (iv), restricting electrical power delivery to an attached hardware device, various hardware devices may depend on the receipt of host delivered power for proper operation, and the restricting the delivery of electrical power can restrict the operation of the attached hardware device.

Outputting one or more notification (B) can include one or more of (i) sending a notification to an administrator user; (ii) sending a notification to an owner user of computer system 12, and outputting an audio notification. Regarding (i) and (ii), system 100 can send the notification of a mobile device computer system associated to the specified user with use of contact data stored in users area 2122 and with use of a messaging system set forth herein. Regarding the audio notification, computer system 12 can include an audio output device, which can be used to output the audio notification, which can take the form, e.g., of an alarm sound.

Producing an audit trail (C) of the detected attack can include (i) controlling a camera sensor to generate a video data record of the attack. One or more sensor 27 (FIG. 7) of respective computer systems 12A-12Z can include a camera sensor configured to output video data which can include moving video data and/or still video data. In one embodiment, system 100 can be configured so that responsively to the criterion of block 2208 is satisfied, system 100 initiates production of an audit trail record of the detected attack using a camera sensor. The camera sensor can be co-located with computer system 12 being protected, or can be an external camera sensor. In the physical implementation view of FIG. 6, computer systems 12D, 12E, and 12F can include integrated camera sensors with view fields directed to their respective I/O interface ports 1201. Computer systems 12A-12D can be provisioned with processes 2141-2145 (FIG. 2) for attack protection as set forth herein. Computer system 12F configured as a mounted security camera can include an integrated camera sensor defining one or more sensor 27 (FIG. 7) with a view field directed toward I/O interface ports 1201 of computer system 12D and 12E.

On the detection of an attack at block 2208 by OS 1210 of computer system 12D, OS 1210 of computer system 12D can control of the camera sensor of computer system 12D to capture video data representing I/O interface port 1201 of computer device 12D, and can control computer system 12D to send a text-based audit trail file for storage into computer system area 2121 and for sending in the form of a notification to the notification recipients set forth herein, e.g., owner enterprise entity users and administrator enterprise entity users. The audit trail file can be a text-based file (e.g., in Extensible Markup Language format, XML) encoding the captured video data and/or can encode a reference to a video data file representing the attack. The audit trail file can encode relevant data of the detected attack, e.g., a timestamp recording the time of the attack, an identifier of the attacked computer system, video data representing I/O interface port 1201 at the time of the attack, copies of malicious keystroke commands transmitted from the attacking hardware device to computer system 12D, copies of malicious code, and file data transmitted from the attacking hardware device to computer system 12D.

Figure 6:
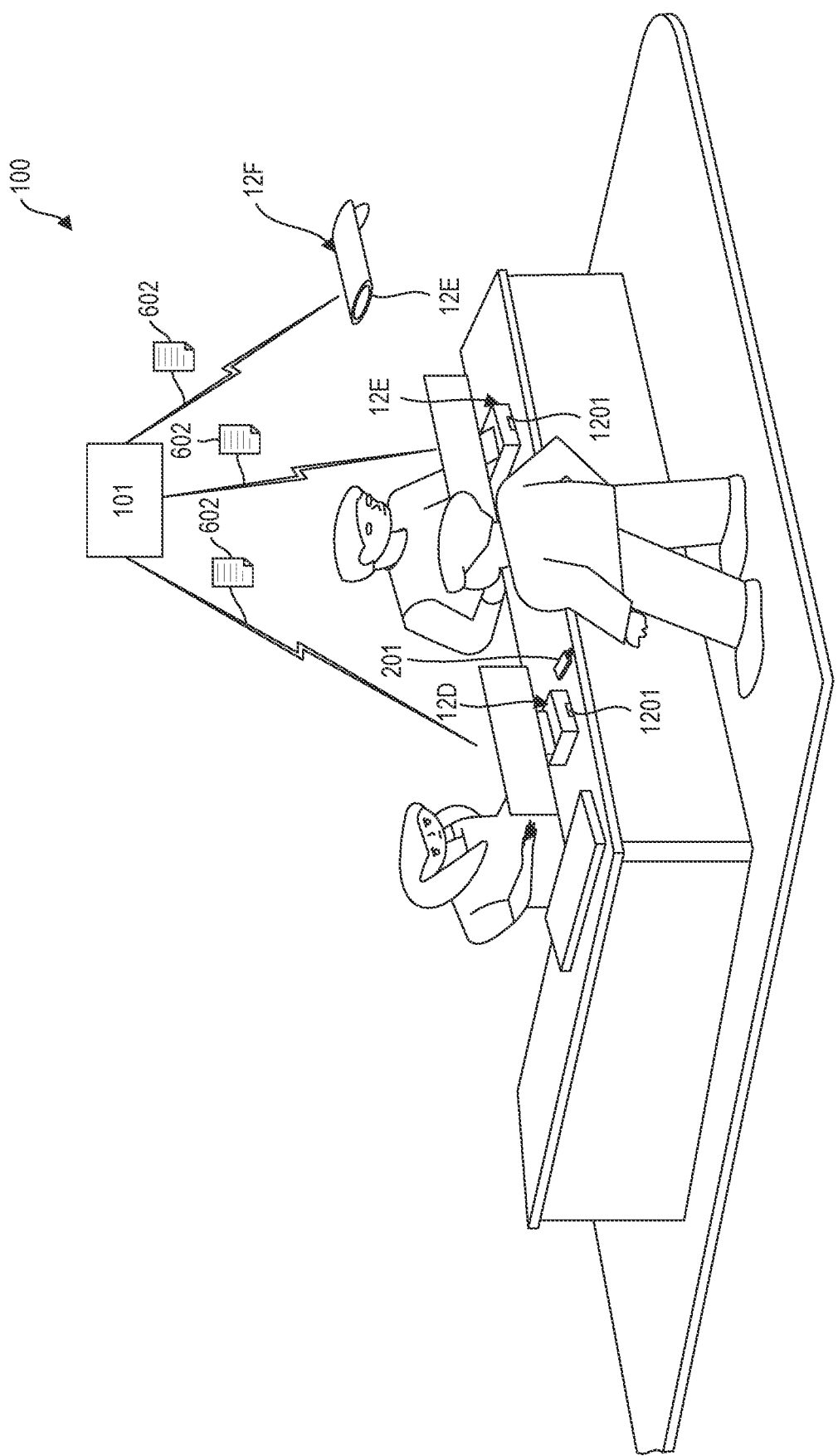
FIG. 6 is a physical implementation view of a system having a manager system and computer system according to one embodiment.

Still referring to FIG. 6, on the detection of an attack at block 2208 by OS 1210 of computer system 12D, OS 1210 via messaging of manager system 110 can control the camera sensor (element 27, FIG. 7) of computer system 12F to capture video data representing I/O interface port 1201 of computer device 12D, and can control computer system 12F to send a text-based audit trail file 602 for storage into computer system area 2121, and for sending in the form a notification to the notification recipients set forth herein, e.g., owner users and administrator users. The audit trail file can be a text-based file (e.g., in Extensible Markup Language format, XML) encoding the captured video data and/or can encode a reference to a video data file representing the attack. The audit trail file can encode relevant data of the detected attack, e.g., a timestamp recording the time of the attack, an identifier of the attacked computer system, video data representing I/O interface port 1201 at the time of the attack, copies of malicious keystroke commands transmitted from the attacking hardware device to computer system 12D, copies of additional malicious data including malicious code, and file data transmitted from the attacking hardware device to computer system 12D.

Destroying the hardware device provided by AEHID 201 (D) can include transmitting electrical energy signals to the attached hardware device that is configured to destroy and therefor render inoperable the attached hardware device. The transmitted electrical energy signal can include providing electrical power to the attached hardware device sufficient to overload and destroy the attached hardware device. The transmitted electrical energy signal can include, e.g., a voltage signal and/or a current signal. In one embodiment, computer system 12 destroying an attached hardware device can include sending signal data to the hardware device and listening for return data for confirmation that the hardware device has been destroyed.

OS 1210 can be configured so that OS 1210 can load a particular one of device drivers 1216A-1216Z (FIG. 2) on the authorization of an attached device. For implementation of one or more of actions (A)-(B), OS 1210 by data management process 1214 can load a custom security device driver for facilitating communication with an attached hardware device provided by AEHID 201. In one embodiment, the custom security driver can be configured to extract malicious data from an attached hardware device and report the malicious data in an audit trail recording an attack. Malicious data can include, e.g., malicious commands encoded as keystrokes, malicious code defining malicious programs, and malicious file data. A custom security driver configured, in the context of USB, for extracting malicious data for audit trail reporting can include functional specification parameters as set forth in Table E.

TABLE E (Specification data for custom security driver for enhanced audit trail)

1. A system is provided that triggers the replacement of the original USB HID driver loaded for a modified USB driver designed for extracting comprehensive malicious data from an attached hardware device and for reporting the extracted malicious data in an audit trail.
2. The modified driver will be only loaded on the port in which the malicious device was connected.
3. The modified driver after recognition of a signature string specifying an HID class can continue to present to the attached hardware device additional requests for descriptive data, e.g., in the form of configuration descriptors and/or the report descriptors. Thus, the attacked who may be remotely and wirelessly monitoring the attack might be deceived into believing the attack has been successful.
4. According to USB specification compliant behavior, the host periodically polls an authorized attached hardware device's interrupt IN endpoint during operation. The periodic polling defines data request data. When the device has data to send, it forms a report of descriptive data and sends it as a reply to the poll token. The modified custom driver can continue to poll the attached hardware device's interrupt IN PIN to deceive the attacker that the attack has been successful and to induce the continued presentment of malicious data from the attached hardware device to the host.
5. On receipt of any descriptive data including the induced poll reply data, the custom security driver can restrict the presentment of any command data device by the received data to a command handler interface of OS 1210. Thus, any command data defined by the received data will not be executed.
6. The custom driver can report extracted malicious data from the hardware device into the audit trail file 602, and OS 1210 can transmit the audit trail file 602 to manager system 110 for storage and/or inclusion in a notification to an owner user and/or an administrator user as explained in reference to FIG. 6.

With reference to Table E, there is set forth herein a method wherein initiating a security process includes initiating a security process wherein a computer system 12, in response to a criterion being satisfied, loads a custom security driver that supports communications with an external device that has transmitted a hardware device transmitted data, wherein the custom security driver, subsequent to the criterion being satisfied, (i) sends data request communications to the external device that emulate operation of a device driver loaded for support of an authorized hardware device; (ii) receives responsively to the data request communications subsequent data from the external device, and (iii) initiates creation of audit trail file 602 recording the subsequent data, wherein the custom security driver restricts presentment of command data defined by the subsequent data to a command handler interface of computer system 12.

A custom security driver configured, in the context of USB for managed destruction, is described with reference to the specification data of Table F.

TABLE F

1. A system that triggers the replacement of the original USB HID driver loaded for a modified USB driver designed to provide an increased power to destroy the device connected to that said port. Generic USB drivers (like HID) have instructions to prevent any overload of power that may damage the device. The custom driver permits delivery of electrical energy to the attached device sufficient to overload and destroy the attached device.
2. The modified custom security driver will be only loaded on the port in which the malicious device was connected.
3. The modified custom security driver will output an increased current to the device to disable/destroy the connected device.

TABLE F-continued

4. After the discharge of current, the driver will attempt to communicate with the external device.
5. If the device responds, then a second discharge will be applied.
6. Another attempt will be performed to communicate with the external device.
7. If the device still responds, then the driver will increase the amount of current of the discharge.
8. This cycle will be repeated until the device is rendered as non-responsive.
9. Once the device is non-responsive, the system will disable the driver.
10. To re-enable the standard USB HID driver, administrator password input will be required.

With reference to Table F, there is set forth herein, a method wherein initiating a security process includes initiating a security process wherein computer system 12, in response to a criterion being satisfied, loads a custom security driver that supports communications with an external device that has transmitted the hardware device transmitted data, wherein the custom security driver, subsequent to the criterion being satisfied, is operational for (i) sending an amount of electrical energy to the external device that is sufficient to overload the external device; (ii) transmitting to the external device a request for return data; (iii) monitoring for receipt of the requested return data; and (iv) iteratively performing the sending, the transmitting, and the monitoring until the return data is determined to be not received by the monitoring.

Another custom driver can include the combined functionalities of the custom drivers described with reference to Tables E and F. That is, the custom security driver can be operational to extract comprehensive malicious data and reporting, and once extraction is complete, the managed destruction cycle can be performed.

On completion of block 2210, OS 1210 can proceed to block 2211. At block 2211, OS 1210 can determine that an unlock criterion has been satisfied. An unlock criterion can be satisfied, e.g., when an authorized user has requested to re-login. If an unlock criterion has been satisfied, OS 1210 can proceed to block 2212 to unlock computer system 12. For the time that computer system 12 remains locked, OS 1210 can proceed to return block 2212. At return block 2212, OS 1210 can return to block 2206 to iteratively ascertain a security risk level of computer system 12 and can iteratively perform the loop of blocks 2206 through block 2212 until a time that an unlock criterion has been satisfied. Referring to the loop of blocks 2206-2212, it can be seen that OS 1210 can iteratively perform the loop of blocks 2206-2212 selectively when computer system 12 is in a locked state. In some embodiments, OS 1210 can be configured to iteratively perform the loop of blocks 2206-2212 responsively to examination of status data by OS 1202 (or application 1120Z) specifying an operational state (locked or unlocked) of computer system 12. One or more of management processes 1211-1214 can make available state data that specifies an operational state (locked or unlocked) of computer system 12. In one embodiment, OS 1210 at blocks 2204-2205 can determine whether a criterion for a locked state is present and can drive computer system 12 into a locked state on the determination that the criterion for the locked state is present. In another embodiment, OS 1210 (or application 1220Z) at blocks 2204-2205 can examine available operation state data available from OS 1210 to ascertain that a locked state is active and can proceed to perform the loop of blocks 2206-2212 conditionally on the determination that computer system 12 is in a locked operational state.

At output block 2210, OS 1210 can provide one or more output to implement a security process. Attributes of the security process can be predetermined or determined based on action decision block 2209. The one or more output can include, e.g., one or more output to perform, e.g., disabling I/O interface port 1201, (B) outputting at least one notification, (C) producing an audit trail of a detected attack, and (D) destroying the attached hardware device as set forth herein. At block 1105, manager system can implement any action associated to the output involving manager system 110. At block 2212, AEHID 201 can implement any action associated to the output involving AEHID 210. On completion of block 1105, manager system 110 can return to block 1101 so that manager system 110 can iteratively perform the loop of blocks 1101-1105.

A method for performance by OS 1210, according to one embodiment, is illustrated with reference to FIG. 5. At block 5002, OS 1210 can be performing background computer system status monitoring to iteratively determine at block 5004 whether computer system 12 is in a locked operating state. On the determination that computer system 12 is not locked, OS 1210 can iteratively perform the loop of block 5002 to block 5004. On the determination that computer system 12 is locked, OS 1210 can proceed to block 5006. At block 5006, OS 1210 can execute security monitoring and during the performance of security monitoring, OS 1210 can iteratively perform the loop of blocks 5006 to block 5008 until at block 5008, it is determined that the class 002H USB device has been attached to I/O interface port 1201. On the determination that a hardware device presenting descriptive data specifying class IIH has been attached, OS 1210 can proceed to block 5010. At block 5010, OS 1210 can initiate capture of video data representing I/O interface port 1201 to record video data evidence of the adversarial attack. On completion of block 5010, OS 1210 can proceed to block 5012. At block 5012 OS 1210 can determine whether a security risk level associated to computer system 12 satisfies the threshold. On the determination that a current security risk level associated to computer system 12 does not satisfy a threshold, OS 1210 can proceed to block 5014. At block 5014, OS 1210 can disable I/O interface port 1201 and then can proceed to block 5016. At block 5016, OS 1210 can send a notification and/or an alert respecifying that an adversarial attack has occurred and has been detected. If at block 5012 OS 1210 determines that security risk level satisfies the threshold T, OS 1210 can proceed to block 5018. At block 5018, OS 1210 can disable I/O interface port 1201 and then can proceed to block 5010. At block 5010, OS 1210 can destroy the attached hardware device attached to I/O interface port 1201. In one embodiment, OS 1210 can initiate destruction of the attached hardware device by delivering electrical power to the attached hardware device sufficient to overload and destroy the attached device.

Certain embodiments herein may offer various technical computing advantages and practical that applications, including computing advantages and practical applications arising to address problems arising the realm of computer systems. Embodiments herein, for example, can improve computer security by sensing of a hardware based adversarial attack in which descriptive data advertising device capabilities has been falsely encoded into firmware of a hardware device attachable to an I/O interface port. Embodiments herein can detect the presence of an adversarial hardware attack and can responsively perform a security process. The security process can include one or more action, including, e.g., disabling an I/O interface port, creation of an audit trail including video data photographic evidence that records the attack, and destroying of an adversarial hardware device. Embodiments herein can ascertain security level risk associated to a computer system and select actions to be included within a security process in dependence on the ascertained security level risk. For topic extraction which can be used to determine a security risk level associated to a computer system, embodiments herein can activate processing of application data and/or file data such as document file by natural language processing (NLP). In one embodiment, performing a security process can include producing an audit trail record, wherein the audit trail record includes a video data representation of an I/O interface port at a time of the determining that hardware device transmitted data received through the I/O interface port of a computer system satisfies a criterion, and wherein the audit trail record includes a timestamp specifying the time of the determining that the hardware device transmitted data received through the I/O interface port of the computer system satisfies the criterion. Various decision data structures can be used to drive artificial intelligence (AI) decision making, such as decision data structure that cognitively and dynamically determine a security risk level. Embodiments herein can employ data structuring processes, e.g., processing for transforming unstructured data into a form optimized for computerized processing. Embodiments herein can include artificial intelligence processing platforms featuring improved processes to transform unstructured data into structured form permitting computer based analytics and decision making. Embodiments herein can include particular arrangements for both collecting data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 7:
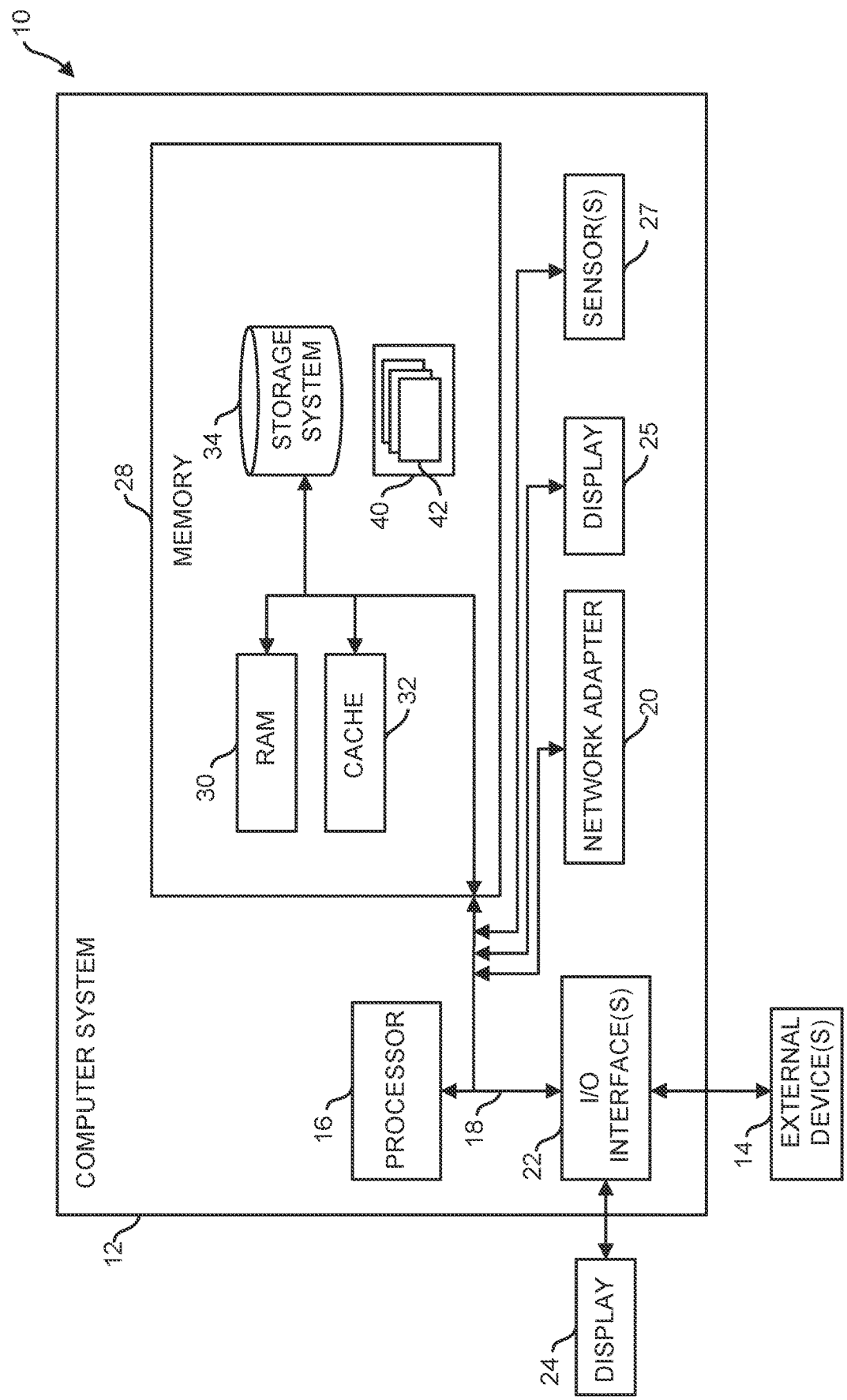
FIG. 7 depicts a computing node according to one embodiment.
Figure 8:
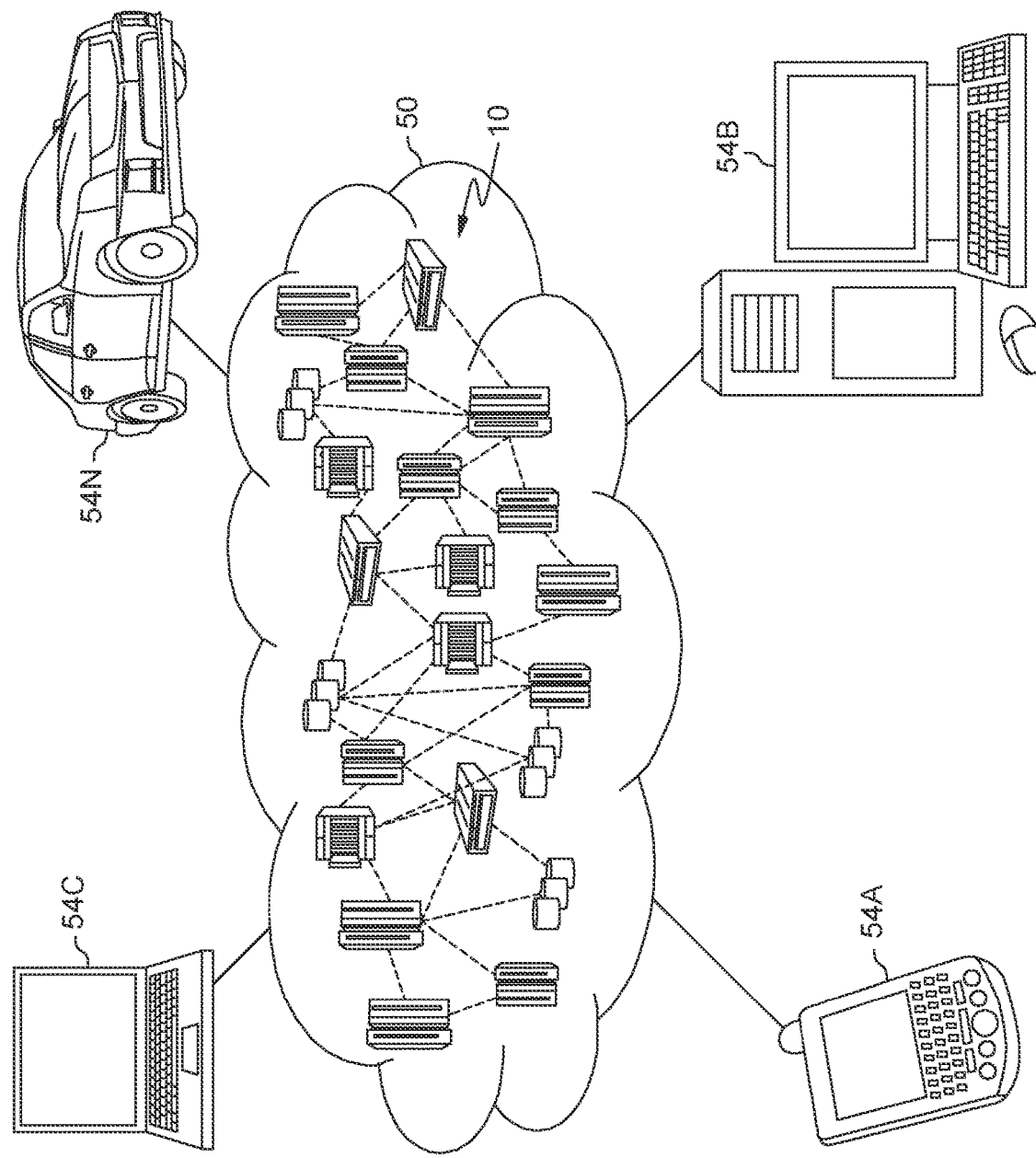
FIG. 8 depicts a cloud computing environment according to one embodiment.
Figure 9:
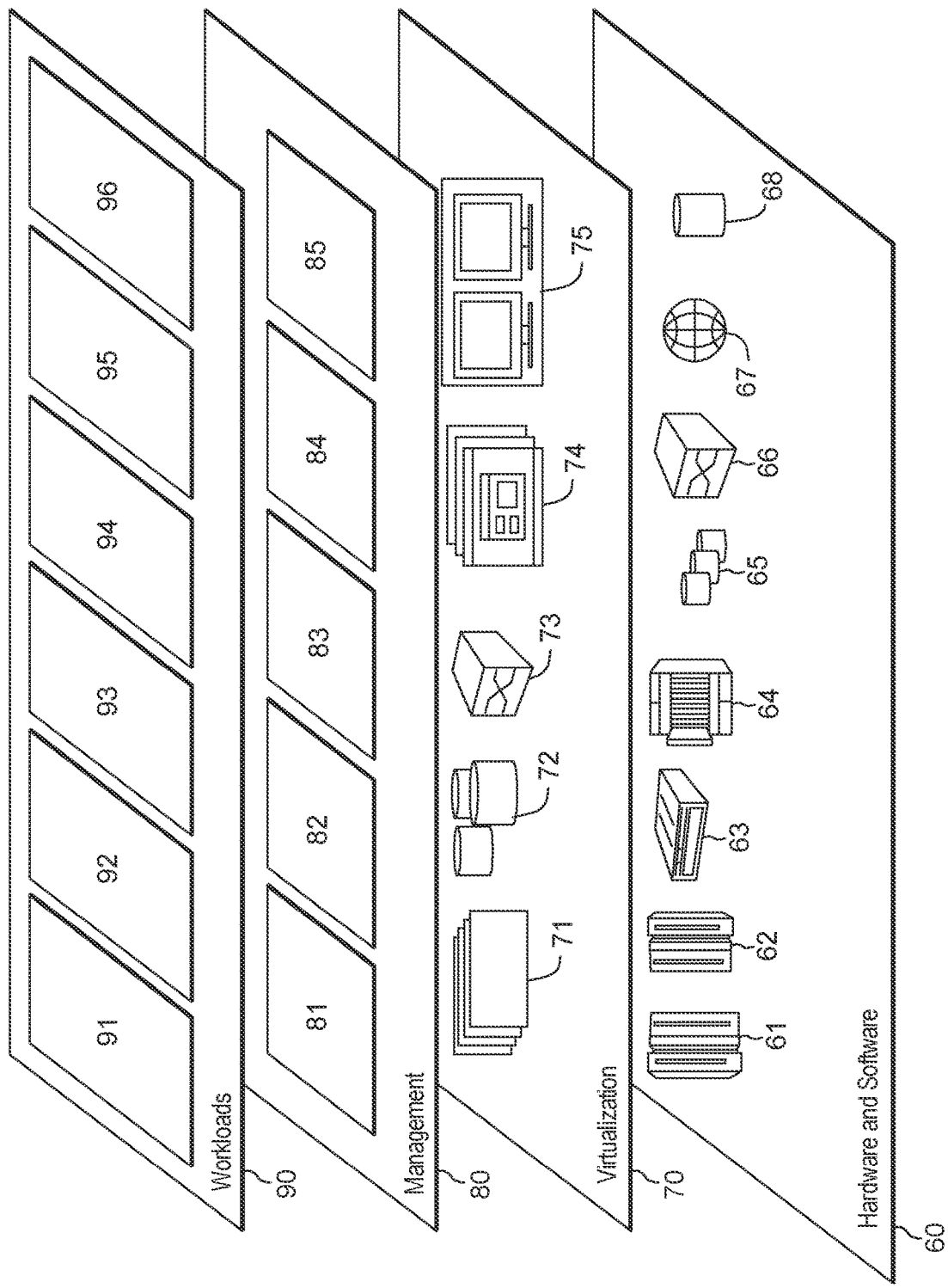
FIG. 9 depicts abstraction model layers according to one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to manager system 110 as set forth in the flowchart of FIG. 4. In one embodiment, one or more client computer systems 12A-12Z, 12 can include one or more computing node 10 and can include one or more program 40 for performing functions described with reference to one or more client computer device 130A-130Z as set forth in the flowchart of FIG. 4 and FIG. 5. In one embodiment, the computing node based systems and devices depicted in FIGS. 1 and 2 can include one or more program 40 for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for hardware attack computer system security as set forth herein. The processing components 96 can be implemented with use of one or more program 40 described in FIG. 9.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
examining hardware device transmitted data received through an I/O interface port of a computer system;
determining, in dependence on the examining, whether the hardware device transmitted data received through the I/O interface port of the computer system satisfies a criterion; and
in response to determining that the hardware device transmitted data received through the I/O interface port of the computer system satisfies the criterion, initiating a security process for protecting the computer system,
wherein initiating the security process comprises loading, by the computer system, a custom security driver that supports communications with an external device that transmitted the hardware device transmitted data, and
wherein the custom security driver, subsequent to the criterion being satisfied is operational for (i), sending an amount of electrical energy to the external device that is sufficient to overload the external device; (ii) transmitting to the external device a request for return data; and (iii) monitoring for receipt of the requested return data.

2. The computer implemented method of claim 1, wherein the determining in dependence on the examining whether the hardware device transmitted data received through the I/O interface port of the computer system satisfies the criterion includes determining whether the hardware device transmitted data specifies a human interface device classification.

3. The computer implemented method of claim 1, wherein the determining in dependence on the examining whether the hardware device transmitted data received through the I/O interface port of the computer system satisfies the criterion includes determining whether the hardware device transmitted data matches a signature string.

4. The computer implemented method of claim 1, wherein the method includes ascertaining that the computer system is in a locked operating state, and wherein determining in dependence on the examining whether the hardware device transmitted data received through the I/O interface port of the computer system satisfies the criterion is performed in response to ascertaining.

5. The computer implemented method of claim 1, wherein the method includes ascertaining a security risk status of the computer system and selecting one or more action of the security process in dependence on the identifying.

6. The computer implemented method of claim 1, wherein actions of the security process include one or more of the following selected from the group consisting of (a) disabling the I/O interface port, (b) outputting at least one notification, (c) producing an audit trail of a detected attack, and (d) destroying an external device that has transmitted the hardware device transmitted data.

7. The computer implemented method of claim 1, wherein the method includes determining a security risk level of the computer system and installing an installation package on the computer system in response to the security risk level satisfying a threshold, wherein the installation package provisions the computer system to perform the (i) determining that the hardware device transmitted data received through the I/O interface port of the computer system satisfies the criterion, and (ii) the initiating the security process for protecting the computer system.

8. The computer implemented method of claim 1, wherein the method includes installing an installation package on the computer system during runtime of the computer system, wherein the installation package includes user application layer software code that modifies behavior of an operating system of the computer system so that the operating system performs the (i) determining that the hardware device transmitted data received through the I/O interface port of the computer system satisfies the criterion, and (ii) the initiating the security process for protecting the computer system.

9. The computer implemented method of claim 1, wherein the initiating the security process includes initiating a security process wherein the computer system, in response to the criterion being satisfied, loads a custom security driver that supports communications with an external device that has transmitted the hardware device transmitted data, wherein the custom security driver, subsequent to the criterion being satisfied (i), sends data request communications to the external device that emulate operation of a device driver loaded for support of an authorized hardware device; (ii) receives in response to the data request communications subsequent data from the external device, and (iii) initiates creation of an audit file record recording the subsequent data, wherein the custom security driver restricts presentment of command data defined by the subsequent data to a command handler interface of the computer system.

10. The computer implemented method of claim 1, wherein the custom security driver, subsequent to the criterion being satisfied is further operational for (iv) iteratively performing the sending, the transmitting, and the monitoring until the return data is determined to be not received by the monitoring.

11. The computer implemented method of claim 1, wherein the security process includes disabling the I/O interface port, and wherein the disabling the I/O interface port includes one or more of the following selected from the group consisting of: (i) configuring the computer system to ignore transmitted data of an external device that has transmitted the hardware device transmitted data, even where the transmitted data is compliant with a format required of an I/O interface associated to the I/O interface port; (ii) restricting the computer system from presenting a descriptive data request to an attached hardware device; (iii) restricting launch of a device driver for facilitating communication with the attached hardware device, and (iv) restricting delivery of electrical power for powering the attached hardware device.

12. The computer implemented method of claim 1, wherein the initiating the security process includes producing an audit trail record, wherein the audit trail record includes a video data representation of the I/O interface at a time of the determining that the hardware device transmitted data received through the I/O interface port of the computer system satisfies the criterion, and wherein the audit trail record includes a timestamp specifying a time of the determining that the hardware device transmitted data received through the I/O interface port of the computer system satisfies the criterion.

13. The computer implemented method of claim 1, wherein the determining whether the hardware device transmitted data received through the I/O interface port of the computer system satisfies the criterion is selectively performed while the computer system is in a locked operating state.

14. The computer implemented method of claim 1, wherein the initiating the security process for protecting the computer system includes initiating first security actions in dependence on an ascertaining that a first security risk level is associated to the computer system, and wherein the method includes, in a subsequent iteration of the determining and the initiating, initiating second security actions in dependence on an ascertaining that a second security risk level is associated to the computer system, the second security risk level being increased relative to the first security risk level, the second security actions being more expansive than the first security actions.

15. A computer program product comprising:
a computer readable storage medium readable by one or more processing circuit and storing instructions for execution by one or more processor for performing a method comprising:
examining hardware device transmitted data received through an I/O interface port of a computer system;
determining in dependence on the examining whether the hardware device transmitted data received through the I/O interface port of the computer system satisfies a criterion; and
in response to determining that the hardware device transmitted data received through the I/O interface port of the computer system satisfies the criterion, initiating a security process for protecting the computer system,
wherein the security process includes disabling the I/O interface port, and
wherein the disabling the I/O interface port includes one or more of the following selected from the group consisting of: (i) configuring the computer system to ignore transmitted data of an external device that has transmitted the hardware device transmitted data, even where the transmitted data is compliant with a format required of an I/O interface associated to the I/O interface port; (ii) restricting the computer system from presenting a descriptive data request to an attached hardware device; (iii) restricting launch of a device driver for facilitating communication with the attached hardware device, and (iv) restricting delivery of electrical power for powering the attached hardware device.

16. The computer program product of claim 15, wherein the determining in dependence on the examining whether the hardware device transmitted data received through the I/O interface port of the computer system satisfies the criterion includes determining whether the hardware device transmitted data matches a signature string.

17. The computer program product of claim 15, wherein actions of the security process include each of following (a) disabling the I/O interface port, (b) outputting at least one notification, (c) producing an audit trail of a detected attack, and (d) destroying an external device that has transmitted the hardware device transmitted data.

18. The computer program product of claim 15, wherein the method includes installing an installation package on the computer system during runtime of the computer system, wherein the installation package includes user application layer software code that modifies behavior of an operating system of the computer system so that the operating system performs the (i) determining that the hardware device transmitted data received through the I/O interface port of the computer system satisfies the criterion, and (ii) the initiating the security process for protecting the computer system.

19. The computer program product of claim 15, wherein the initiating the security process includes initiating a security process wherein the computer system, in response to the criterion being satisfied, loads a custom security driver that supports communications with an external device that has transmitted the hardware device transmitted data, wherein the custom security driver, subsequent to the criterion being satisfied is operational for (i), sending an amount of electrical energy to the external device that is sufficient to overload the external device; (ii) transmitting to the external device a request for return data; (iii) monitoring for receipt of the requested return data; and (iv) iteratively performing the sending, the transmitting, and the monitoring until the return data is determined to be not received by the monitoring.

20. The computer program product of claim 15, wherein the security process includes disabling the I/O interface port, and wherein the disabling the I/O interface port includes each of the following: (i) configuring the computer system to ignore transmitted data of an external device that has transmitted the hardware device transmitted data, even where the transmitted data is compliant with a format required of an I/O interface associated to the I/O interface port; (ii) restricting the computer system from presenting a descriptive data request to an attached hardware device; (iii) restricting launch of a device driver for facilitating communication with the attached hardware device, and (iv) restricting delivery of electrical power for powering the attached hardware device.

21. A system comprising:
a memory;
at least one processor in communication with the memory; and
program instructions executable by one or more processor via the memory to perform a method comprising:
examining hardware device transmitted data received through an I/O interface port of a computer system;
determining in dependence on the examining whether the hardware device transmitted data received through the I/O interface port of the computer system satisfies a criterion; and
in response to determining that the hardware device transmitted data received through the I/O interface port of the computer system satisfies the criterion, initiating a security process for protecting the computer system,
wherein the security process includes disabling the I/O interface port, and
wherein the disabling the I/O interface port includes one or more of the following selected from the group consisting of: (i) configuring the computer system to ignore transmitted data of an external device that has transmitted the hardware device transmitted data, even where the transmitted data is compliant with a format required of an I/O interface associated to the I/O interface port; (ii) restricting the computer system from presenting a descriptive data request to an attached hardware device; (iii) restricting launch of a device driver for facilitating communication with the attached hardware device, and (iv) restricting delivery of electrical power for powering the attached hardware device.

22. A computer implemented method comprising:
examining status data associated to a computer system, the computer system having an I/O interface port; and
in dependence on the examining, loading a custom security driver for support of communications between the computer system and an external device which has transmitted data through the I/O interface port,
wherein the custom security driver is operational for (i), sending an amount of electrical energy to the external device that is sufficient to overload the external device; (ii) transmitting to the external device a request for return data; and (iii) monitoring for receipt of the requested return data.

23. The computer implemented method of claim 22, wherein the custom security driver (i), sends data request communications to the external device that emulate operation of a device driver loaded for support of an authorized hardware device; (ii) receives in response to the data request communications subsequent data from the external device, and (iii) initiates creation of an audit file record recording the subsequent data, wherein the custom security driver restricts presentment of command data defined by the subsequent data to a command handler interface of the computer system.

24. The computer implemented method of claim 22, wherein the custom security driver is further operational for (iv) iteratively performing the sending, the transmitting, and the monitoring until the return data is determined to be not received by the monitoring.

25. The computer implemented method of claim 22, wherein the examining status data includes subjecting text based application data stored on the computer system to natural language processing to ascertain topics of the application data, and wherein the custom security driver (i), sends data request communications to the external device that emulate operation of a device driver loaded for support of an authorized hardware device; (ii) receives in response to the data request communications subsequent data from the external device, and (iii) initiates creation of an audit file record recording the subsequent data, wherein the custom security driver restricts presentment of command data defined by the subsequent data to a command handler interface of the computer system.

* * * * *